US012373443B2

(12) United States Patent
Kuang et al.

(10) Patent No.: US 12,373,443 B2
(45) Date of Patent: Jul. 29, 2025

(54) RETRIEVAL AND COMPOSITION OF MODULAR SPACES

(71) Applicant: Google LLC, Mountain View, CA (US)

(72) Inventors: Cliff Shan Kuang, San Francisco, CA (US); Joshua Lance Leviste Principe, Los Angeles, CA (US); Kevin Gaunt, San Francisco, CA (US); Ricardo Bruno Augusto Henriques, Lagos (PT)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/009,791

(22) PCT Filed: Jun. 30, 2022

(86) PCT No.: PCT/US2022/035789
§ 371 (c)(1),
(2) Date: Dec. 12, 2022

(87) PCT Pub. No.: WO2024/005830
PCT Pub. Date: Jan. 4, 2024

(65) Prior Publication Data
US 2024/0303243 A1 Sep. 12, 2024

(51) Int. Cl.
*G06F 17/00* (2019.01)
*G06F 16/22* (2019.01)
*G06F 16/2457* (2019.01)

(52) U.S. Cl.
CPC .... *G06F 16/24578* (2019.01); *G06F 16/2228* (2019.01)

(58) Field of Classification Search
CPC ............. G06F 16/24578; G06F 16/222; G06F 16/2228; G06F 16/24575
See application file for complete search history.

(56) References Cited

U.S. PATENT DOCUMENTS 10,417,206 B2* 9/2019 Nachiappan ............ G06F 16/25
2014/0075328 A1 3/2014 Hansen et al.
(Continued)

FOREIGN PATENT DOCUMENTS

EP 3557505 10/2019

OTHER PUBLICATIONS

Nikhita Vedula, Nedim Lipka, Pranav Maneriker, and Srinivasan Parthasarathy. Open Intent Extraction from Natural Language Interactions. In Proceedings of The Web Conference 2020. Association for Computing Machinery, <https://doi.org/10.1145/3366423.3380268>, Apr. 2020.*
(Continued)

*Primary Examiner* — Greta L Robinson
(74) *Attorney, Agent, or Firm* — DORITY & MANNING P.A.

(57) ABSTRACT

Example embodiments of the present disclosure provide for an example method including obtaining component data associated with a plurality of components. The example method includes generating an index of the component data and obtaining user input data indicative of a request. The example method includes processing the user input data to determine an intent associated with the request and obtaining, based on the intent, data indicative of one or more components from the index. The example method includes determining a rank for at least one respective component of the one or more components. The example method includes updating a user interface to display the one or more components, wherein the components are displayed based at least in part on the rank of the respective component. The example method can include generating modular spaces composed of a plurality of components to generate composite application interfaces which can include cross-application functionalities.

20 Claims, 18 Drawing Sheets

(56) References Cited

U.S. PATENT DOCUMENTS

| | | | |
|---|---|---|---|
| 2016/0162532 A1 | 6/2016 | Zhang et al. | |
| 2016/0189444 A1 | 6/2016 | Madhok et al. | |
| 2018/0060326 A1* | 3/2018 | Kuo | G06F 16/9535 |
| 2019/0205386 A1 | 7/2019 | Kumar et al. | |
| 2019/0341027 A1 | 11/2019 | Vescovi et al. | |
| 2021/0112154 A1 | 4/2021 | Rodriguez et al. | |

OTHER PUBLICATIONS

International Search Report and Written Opinion for PCT/US2022/035789, mailed on Feb. 13, 2023, 11 pages.
International Preliminary Report on Patentability for Application No. PCT/US2022/035789, mailed Jan. 9, 2025, 7 pages.

* cited by examiner

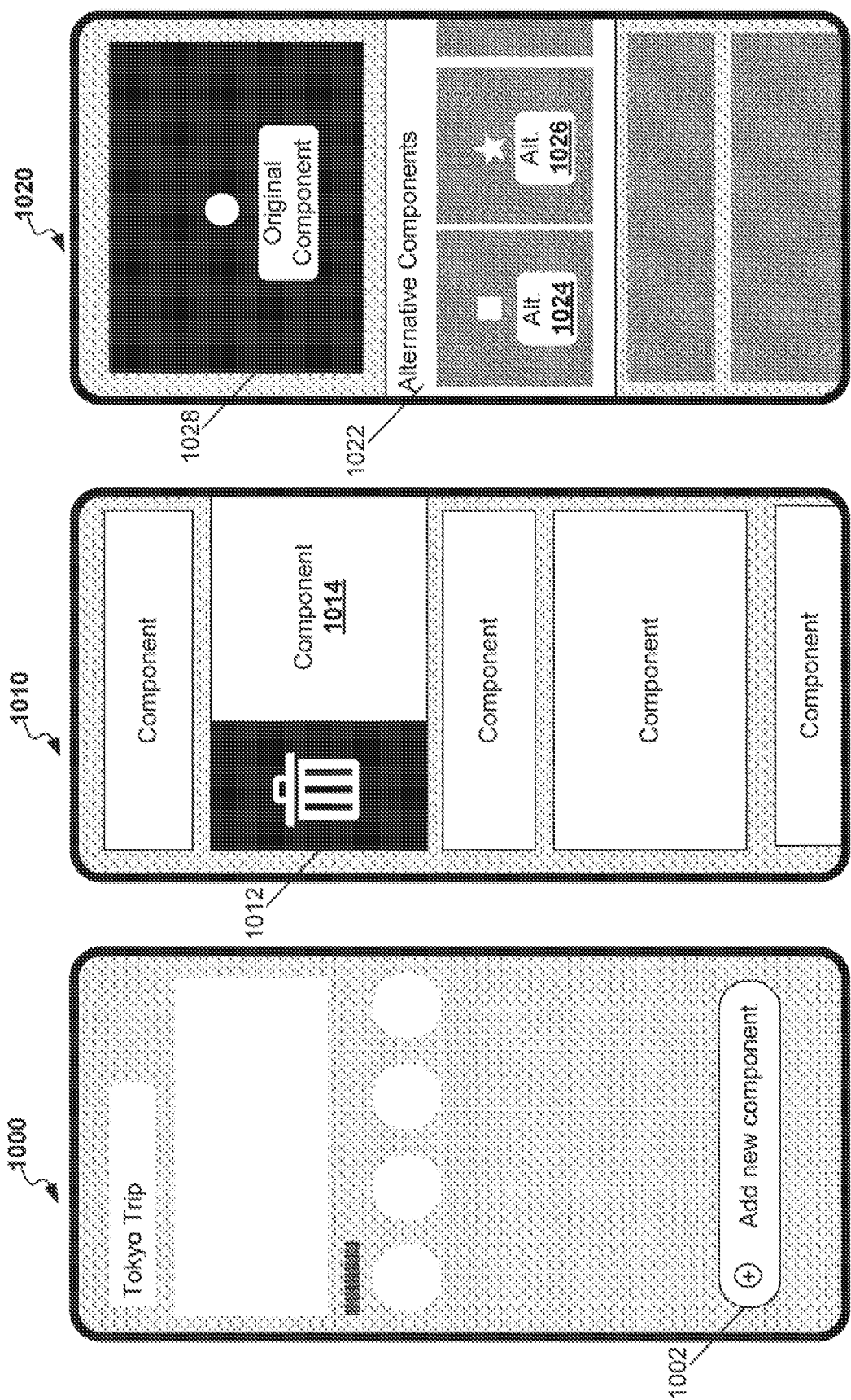

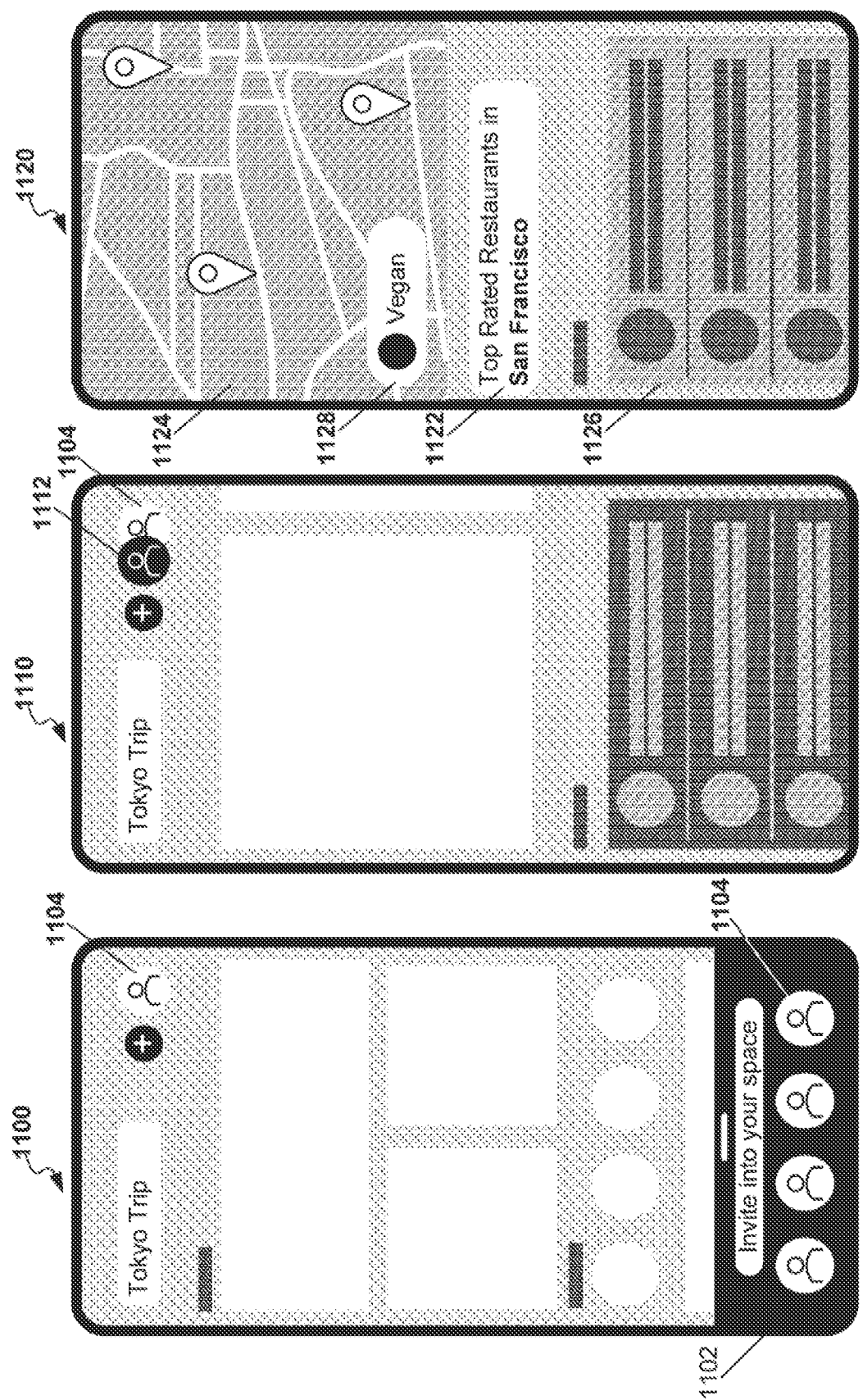

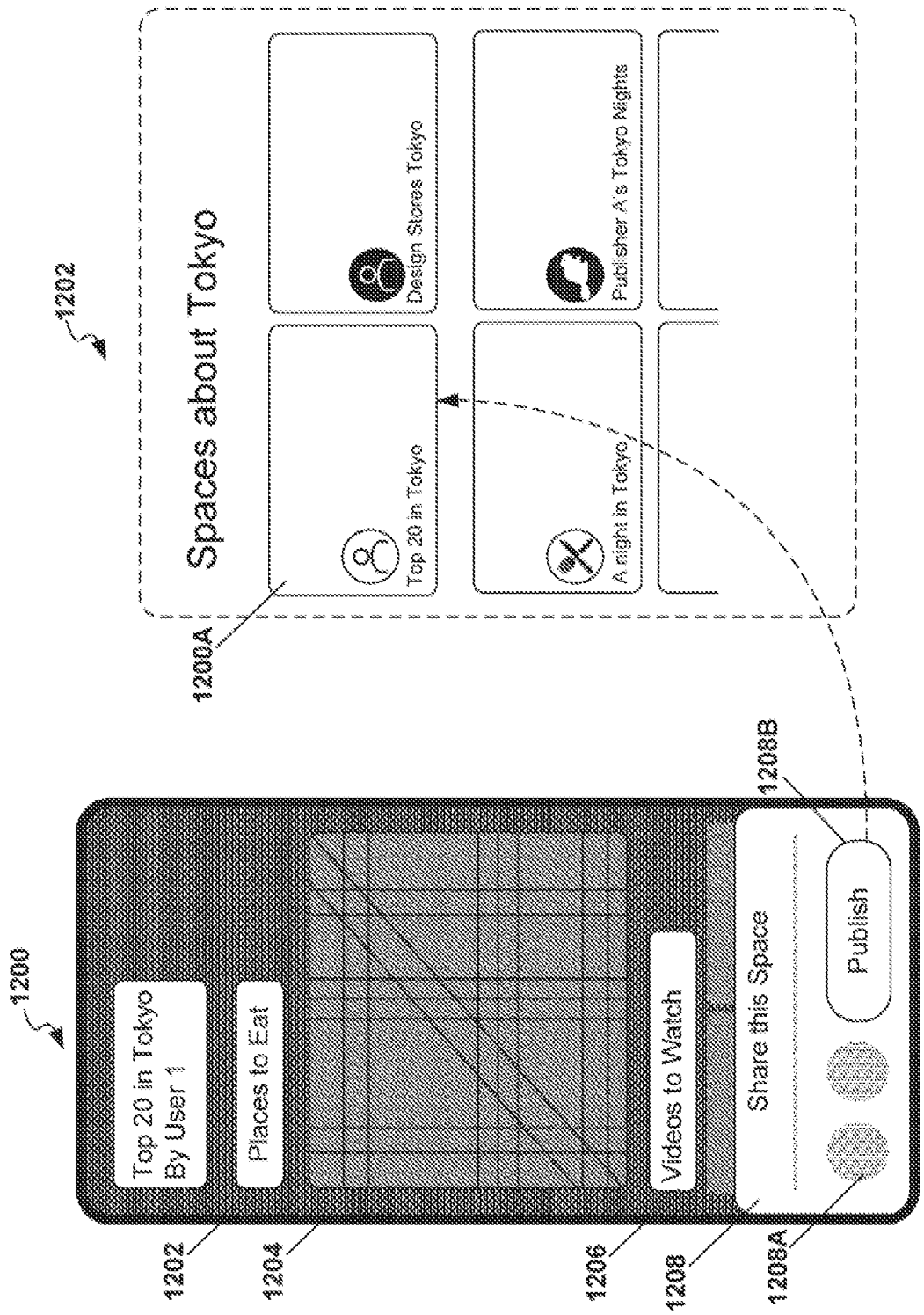

RETRIEVAL AND COMPOSITION OF MODULAR SPACES

PRIORITY CLAIM

This application is based upon and claims the right of priority under 35 U.S.C. § 371 to International Application No. PCT/US2022/035789 filed on Jun. 30, 2022, which is incorporated by reference herein.

FIELD

The present disclosure relates generally to systems and methods for indexing and ranking items.

BACKGROUND

Computing devices can perform many tasks and retrieve results in response to user input indicative of requests. Retrieving results in response to user input can be performed based in part on generating and querying indexes.

SUMMARY

Aspects and advantages of embodiments of the present disclosure will be set forth in part in the following description, or can be learned from the description, or can be learned through practice of the embodiments.

In one example aspect, the present disclosure provides for an example system for providing an adaptive user interface, including one or more processors and one or more memory devices storing instructions that are executable to cause the one or more processors to perform operations. In some implementations the one or more memory devices can include one or more transitory or non-transitory computer-readable media storing instructions that are executable to cause the one or more process to perform operations. In the example system, the operations include obtaining component data associated with a plurality of components. In the example system, the operations include generating an index of the component data. In the example system, the operations include obtaining user input data indicative of a request. In the example system, the operations include processing the user input data to determine an intent associated with the request. In the example system, the operations include obtaining, based on the intent, data indicative of one or more components from the index. In the example system, the operations include determining a rank for at least one respective component of the one or more components. In the example system, the operations include updating a user interface to display the one or more components, wherein the components are displayed based at least in part on the rank of the respective component.

In some embodiments of the example system, the respective component comprises a portion of functionality. In some embodiments of the example system, the portion of functionality includes at least one of a functionality generated by a user or a functionality generated by a developer.

In some embodiments of the example system, the respective component comprises an application.

In some embodiments of the example system, the operations include providing for display a space comprising a plurality of components.

In some embodiments of the example system, the space is automatically generated based at least in part on data associated with an individual user or aggregated data indicative of a plurality of users.

In some embodiments of the example system, determining the rank for the at least one respective component is based on at least one of: (i) one or more user generated spaces, (ii) semantic processing of relationships between a plurality of components in a user generated space, (iii) the index of the component data, or (iv) prediction of a relationship between a plurality of candidate components.

In some embodiments of the example system, determining the rank is performed by a machine-learned model.

In some embodiments of the example system, the operations include generating an index of the one or more user generated spaces. In some embodiments of the example system, the operations include training the machine-learned model using the index of the one or more user generated spaces.

In some embodiments of the example system, the semantic processing of relationship between a plurality of components in the user generated space includes obtaining data indicative of a plurality of components associated with the user generated space. In some embodiments of the example system, the semantic processing of relationship between a plurality of components in the user generated space includes updating, based on the data indicative of the plurality of components, the index of the component data.

In some embodiments of the example system, the data indicative of the plurality of components associated with the user generated space comprises at least one of: (i) data indicative of cross-functionality of the one or more components associated with the user generated space, (ii) data indicative of one or more tags associated with the respective components associated with the user generated space, or (iii) data indicative of a description of the user generated space.

In some embodiments of the example system, the one or more tags comprise a label of at least one of a component type, subject matter, or associated intent.

In some embodiments of the example system, the data indicative of the description of the user generated space comprises a user-generated description of the intent associated with the user generated space.

In some embodiments of the example system, the data indicative of the description of the user generated space comprises an intent generated by a machine-learned model indicative of an intent associated with the user generated space.

In some embodiments of the example system, the operations include processing the user input data to determine an intent associated with the request. In some embodiments of the example system, the operations include maintaining data enclaves comprising user data, wherein the data enclaves prevent access to user data from third parties. In some embodiments of the example system, the operations obtaining requests from component components for access to the user data. In some embodiments of the example system, the operations providing limited access to user data.

In some embodiments of the example system, providing limited access to user data includes obtaining portions of functionality associated with the component. In some embodiments of the example system, providing limited access to user data includes determining necessary user data for performing the portions of functionality. In some embodiments of the example system, providing limited access to user data includes providing access to the necessary user data to perform the portions of functionality. In some embodiments of the example system, providing limited access to user data includes processing, within the data enclave, the user data and the portions of functionality. In some embodiments of the example system, providing limited access to user data includes performing the portions of functionality using the accessed user data.

In some embodiments of the example system, the portion of functionality includes at least one of: (i) coordinating scheduling for a user, (ii) causing media to play, (iii) coordinating a user placing an order, (iv) coordinating a leg of travel for a user, (v) providing location specific information, (vi) providing a link or preview of third-party content, (vii) providing an input component, or (viii) providing means for controlling items associated with the user.

In some embodiments of the example system, the user data comprises data indicative of at least one of (i) one or more user preferences, (ii) user account data, or (iii) user history.

In an example aspect, the present disclosure provides for an example computer-implemented method. The example method includes obtaining component data associated with a plurality of components. The example method includes generating an index of the component data. The example method includes obtaining user input data indicative of a request. The example method includes processing the user input data to determine an intent associated with the request. The example method includes obtaining, based on the intent, data indicative of one or more components from the index. The example method includes determining a rank for at least one respective component of the one or more components. The example method includes. The example method includes updating a user interface to display the one or more components. The components can be displayed based at least in part on the rank of the respective component.

In some embodiments of the example method, the respective component comprises a portion of functionality. In some embodiments of the example method, the portion of functionality comprises at least one of a functionality generated by a user or a functionality generated by a developer.

In some embodiments of the example method, the respective component comprises an application.

In some embodiments of the example method, the example method includes providing for display a space comprising a plurality of components.

In some embodiments of the example method, the space is automatically generated based at least in part on data associated with an individual user or aggregated data indicative of a plurality of users.

In some embodiments of the example method, the example method includes determining the rank for the at least one respective component is based on at least one of: (i) one or more user generated spaces, (ii) semantic processing of relationships between a plurality of components in a user generated space, (iii) the index of the component data, or (iv) prediction of a relationship between a plurality of candidate components.

In some embodiments of the example method, determining the rank is performed by a machine-learned model.

In some embodiments of the example method, the method includes generating an index of the one or more user generated spaces. In some embodiments of the example method, the method includes training the machine-learned model using the index of the one or more user generated spaces. In some embodiments of the example method, the method includes the semantic processing of relationship between a plurality of components in the user generated space includes obtaining data indicative of a plurality of components associated with the user generated space. In some embodiments of the example method, the method includes updating, based on the data indicative of the plurality of components, the index of the component data.

In some embodiments of the example method, the data indicative of the plurality of components associated with the user generated space includes at least one of: (i) data indicative of cross-functionality of the one or more components associated with the user generated space, (ii) data indicative of one or more tags associated with the respective components associated with the user generated space, or (iii) data indicative of a description of the user generated space.

In some embodiments of the example method, the one or more tags comprise a label of at least one of a component type, subject matter, or associated intent.

In some embodiments of the example method, the data indicative of the description of the user generated space comprises a user-generated description of the intent associated with the user generated space.

In some embodiments of the example method, the data indicative of the description of the user generated space comprises an intent generated by a machine-learned model indicative of an intent associated with the user generated space.

In some embodiments of the example method, the method includes processing the user input data to determine an intent associated with the request. In some embodiments of the example method, the method includes maintaining data enclaves comprising user data, wherein the data enclaves prevent access to user data from third parties. In some embodiments of the example method, the method includes obtaining requests from component components for access to the user data. In some embodiments of the example method, the method includes providing limited access to user data.

In some embodiments of the example method, the method includes providing limited access to user data. In some embodiments of the example method, the method includes obtaining portions of functionality associated with the component components. In some embodiments of the example method, the method includes determining necessary user data for performing the portions of functionality. In some embodiments of the example method, the method includes providing access to the necessary user data to perform the portions of functionality. In some embodiments of the example method, the method includes processing, within the data enclave, the user data and the portions of functionality. In some embodiments of the example method, the method includes performing the portions of functionality using the accessed user data.

In some embodiments of the example method, the portion of functionality comprises at least one of: (i) coordinating scheduling for a user, (ii) causing media to play, (iii) coordinating a user placing an order, (iv) coordinating a leg of travel for a user, (v) providing location specific information, (vi) providing a link or preview of third-party content, (vii) providing an input component, or (viii) providing means for controlling items associated with the user.

In some embodiments of the example method, the user data comprises data indicative of at least one of (i) one or more user preferences, (ii) user account data, or (iii) user history.

In an example aspect, the present disclosure provides for an example transitory or non-transitory computer readable medium embodied in a computer-readable storage device and storing instructions that, when executed by a processor, cause the processor to perform operations. In the example transitory or non-transitory computer readable medium, the operations include obtaining component data associated with a plurality of components. In the example transitory or non-transitory computer readable medium, the operations include generating an index of the component data. In the example transitory or non-transitory computer readable medium, the operations include obtaining user input data indicative of a request. In the example transitory or non-transitory computer readable medium, the operations include processing the user input data to determine an intent associated with the request. In the example transitory or non-transitory computer readable medium, the operations include obtaining, based on the intent, data indicative of one or more components from the index. In the example transitory or non-transitory computer readable medium, the operations include determining a rank for at least one respective component of the one or more components. In the example transitory or non-transitory computer readable medium, the operations include updating a user interface to display the one or more components, wherein the components are displayed based at least in part on the rank of the respective component.

BRIEF DESCRIPTION OF THE DRAWINGS

Detailed discussion of embodiments directed to one of ordinary skill in the art is set forth in the specification, which makes reference to the appended figures, in which:

FIG. 10A depicts a user interface according to example embodiments of the present disclosure.

FIG. 10B depicts a user interface according to example embodiments of the present disclosure.

FIG. 10C depicts a user interface according to example embodiments of the present disclosure.

FIG. 11A depicts a user interface according to example embodiments of the present disclosure.

FIG. 11B depicts a user interface according to example embodiments of the present disclosure.

FIG. 11C depicts a user interface according to example embodiments of the present disclosure.

FIG. 12A depicts a user interface according to example embodiments of the present disclosure.

FIG. 12B depicts a sub element of a user interface according to example embodiments of the present disclosure.

DETAILED DESCRIPTION

Overview

Figure 1:
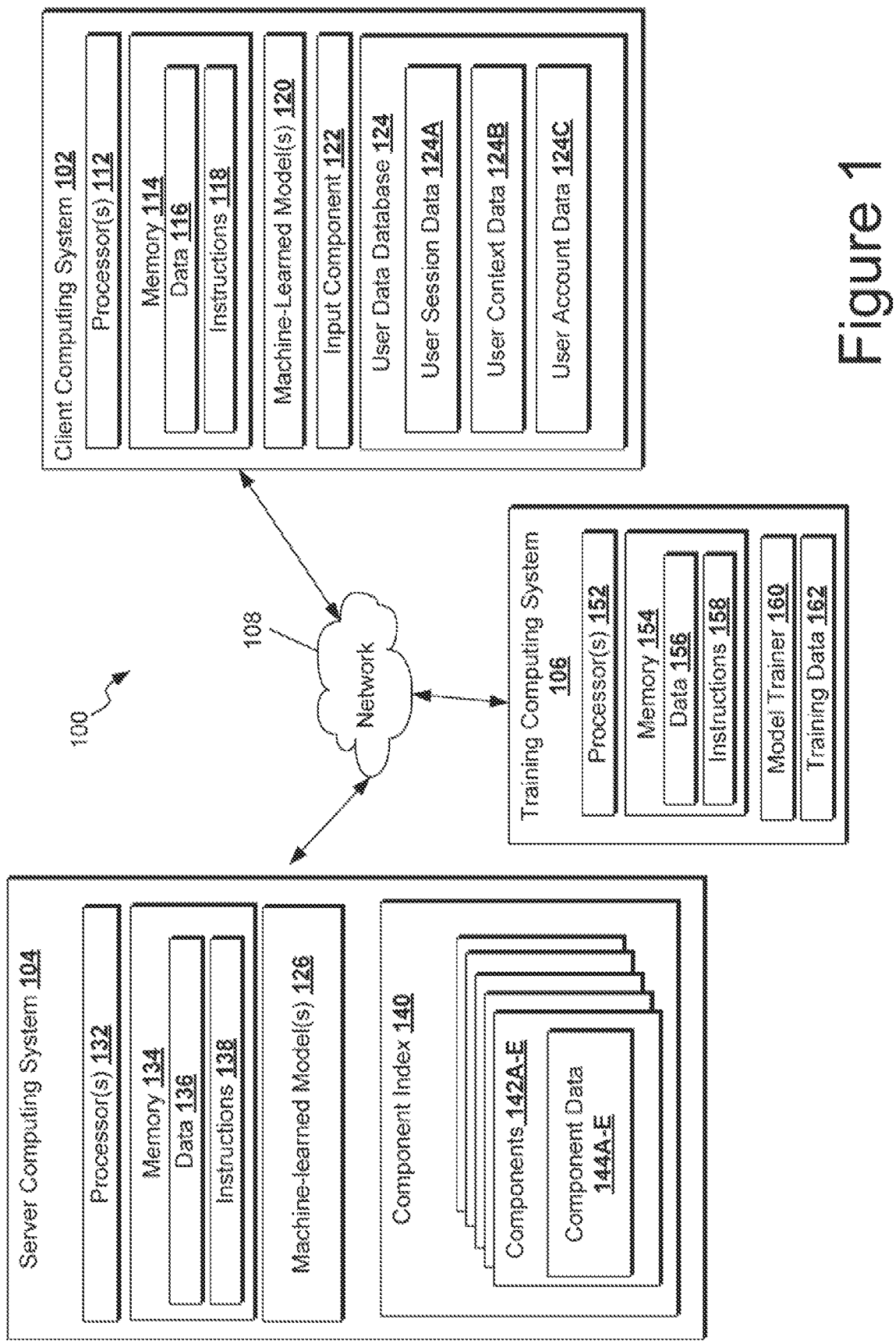
FIG. 1 depicts a block diagram of an example system for retrieving and composing modular application spaces according to example embodiments of the present disclosure.

Generally, the present disclosure is directed to systems and methods for retrieving and composing modular spaces. For example, a user can input a search for "accepted job in city A". The system can determine a broader intent of the user, for example to start a life in a new city, which can involve a need to find a place to live, find a realtor, get adjusted to a new schedule, find a new grocery store, find a new doctor, etc. The system can reference an index of components relating to the various aspects of the user's intent to return a modular space tailored to accomplishing the user's goals. The index can include, for example, learned relationships between a number of components. Components can include, for example, modular components (e.g., modular application components) for performing various tasks or accessing various networked services. In this manner, for instance, the modular space can provide an integrated interface for performing processing tasks using a number of different components (e.g., with similar functions to "traditional applications) relating to the user's intent. In some examples, a modular space can be a modular cross-provider application composed of a plurality of functionalities of traditional applications.

Traditionally, users are restricted to access individual applications and services through interfaces specifically constructed for and dedicated to those individual applications and services. But real-world tasks (e.g., starting a life in a new city) can involve numerous different subtasks that would require accessing a number of different applications, functionalities within applications, and services. In some cases, this can require inefficient interaction with many different user interfaces, installing many different applications, sharing data with many different entities, etc. In some cases, users may not even know what applications or services may provide utility in a given scenario.

Advantageously, example embodiments according to aspects of the present disclosure can provide for a streamlined input interface that integrates modular components from a plurality of sources. For example, aspects of the present disclosure describe the ability to extract functionalities (e.g., of applications) which were once siloed within specific applications and allow for the functionalities to be re-combined with other functionalities to generate bespoke modular spaces which can resemble familiar existing user interfaces (e.g., traditional applications). Additionally, or alternatively, example embodiments can provide for queries over an index of modular components for retrieving one or more components relevant to a user's intent.

In some embodiments, the system can provide for user curation of application components. The system can obtain data indicative of the pairing of one or more application components. This data can be used to train a composer component to generate spaces in response to obtaining user input indicative of a request for a space. For example, the system can obtain user input data indicative of "accepted a job in city A". A user-created space associated with an accepted job tag can be identified as containing potentially relevant application components to present in response to obtaining user input data indicative of "accepted job in city A". In response, the system can generate a new space comprising a plurality of application components that are composed together based on associated component data and the user input data.

The technology of the present disclosure can provide a number of technical effects and benefits. For instance, aspects of the described technology can allow for more efficient allocation of computing resources by retrieving and composing integrated user interfaces for accessing multiple different applications. This can decrease computational resources used by decreasing the amount of redundant user inputs obtained and processed by the system, as well as decreasing the amount of redundant network transmissions with multiple different application servers. For instance, example embodiments can decrease the number of requests or queries submitted by a user due to more efficient on-device interface integration, including by providing a data flow infrastructure for sharing inputs among application components. This can free up memory to be allocated for alternative computing and/or processing functions. This can result in a more efficient utilization of processing resources.

With reference now to the Figures, example embodiments of the present disclosure will be discussed in further detail.

Example Systems

FIG. 1 depicts a block diagram of an example computing system 100 that retrieves and composes modular spaces (e.g., modular application spaces) according to example embodiments of the present disclosure. The system 100 includes a client computing system 102, a server computing system 104, and a training computing system 106 that are communicatively coupled over a network 108.

The client computing system 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The client computing system 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more computer-readable storage media which may be non-transitory, such as RAM, ROM, EEPROM, EPROM, flash memory devices, magnetic disks, etc., and combinations thereof. The memory 114 can store data 116 and instructions 118 which are executed by the processor 112 to cause the client computing system 102 to perform operations.

In some implementations, the client computing system 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIG. 2.

In some implementations, the one or more machine-learned models 120 can be received from the server computing system 104 over network 108, stored in the user computing device memory 114, and then used or otherwise implemented by the one or more processors 112. In some implementations, the client computing system 102 can implement multiple parallel instances of a single machine-learned model 120 (e.g., to perform parallel retrieval and composition of modular application spaces across multiple instances of user data obtained via a user interface associated with a user device (e.g., user device 344).

More particularly, the machine learned model can obtain data indicative of user input (e.g., user session data 124A). The user input data can be associated with a current user session and/or include historical user data. For example, data associated with a current user session can be data obtained in real-time via an input component 122. Historical user data can include data associated with a user account, user characteristics, etc. Historical user data can include data associated with a user device (e.g., device identifier). In addition, or alternatively, historical user data can include data associated with a user identifier. In some embodiments, historical user data can include aggregate data associated with a plurality of user identifiers. In some embodiments, the training data 162 can include session data (e.g., of one or more input sessions) associated with one or more input devices, such as session data indexed over a type of input interface or device (e.g., mobile device with touchscreen, mobile device with keyboard, large touchscreen, small touchscreen, large touchscreen, voice inputs, or combinations thereof, etc.). In some embodiments, the training data 162 can include session data not associated with user identifiers. Using the machine-learned model, the system can query the component index to determine one or more relevant components (e.g., components) and/or spaces provide as output from the machine-learned model. The system can retrieve and/or compose one or more components to create and/or suggest modular application spaces in response to obtaining a user input.

Additionally, or alternatively, one or more machine-learned models 126 can be included in or otherwise stored and implemented by the server computing system 104 that communicates with the client computing system 102 according to a client-server relationship. For example, the machine-learned models 126 can be implemented by the server computing system 104 as a portion of a web service (e.g., a content development service, a campaign management service, a content strategy management service). Thus, one or more models 120 can be stored and implemented at the client computing system 102 and/or one or more models 140 can be stored and implemented at the server computing system 104.

The client computing system 102 can also include one or more user input components 122 that can receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The client computing system can include a user data database 124. User data database 124 can include user session data 124A, user context data 124B, and/or user account data 124C. User session data 124A can include data obtained via input component 122 indicative of a current user session. For example, user session data 124A can include a current search term and/or other user input received within a threshold time of the current session. For example, a user can submit a first search and five minutes later submit a second search. The proximity of the first search and second search in time can be context data 124B. The system can use context data 124B when processing the user query to determine relevant components and modular application spaces to provide in response to the user query. The user input can be used by client computing system 102 to send a request to server computing system 104 for one or more components (e.g., components representing processing tasks, capabilities of applications, functionalities of applications). The computing system can cause the components to be composed and presented to a user via a user interface of a device (e.g., user device 344). User context data 124B can include context of prior sessions and/or historical session data. User context data can include a location, a time, if the query is a question, device used, format of the query, relation of the current query to previous queries, query being a repeat query, query being a new query, etc. User account data 124C can include data associated with a user account (e.g., login, device identifier, user identifier).

The server computing system 104 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more computer-readable storage media which may be non-transitory, such as RAM, ROM, EEPROM, EPROM, flash memory devices, magnetic disks, etc., and combinations thereof. The memory 134 can store data 136 and instructions 138 which are executed by the processor 132 to cause the server computing system 104 to perform operations.

In some implementations, the server computing system 104 includes or is otherwise implemented by one or more server computing devices. In instances in which the server computing system 104 includes plural server computing devices, such server computing devices can operate according to sequential computing architectures, parallel computing architectures, or some combination thereof.

The server computing system 104 can include a component index 140. The component index 140 can include a plurality of components 142A-E and associated component data 144A-E. Component index 140 can be organized in a manner based on component data 144A-E associated with the components 142A-E. The server computing system can parse the component index 140 to determine which component of components 142A-E are most responsive to a user input (e.g., user query, user request, etc.).

As described above, the server computing system 104 can store or otherwise include one or more machine-learned models 126. For example, the models 126 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 126 are discussed with reference to FIG. 2.

The client computing system 102 and/or the server computing system 104 can train the models 120 and/or 140 via interaction with the training computing system 106 that is communicatively coupled over the network 108. The training computing system 106 can be separate from the server computing system 104 or can be a portion of the server computing system 104.

The training computing system 106 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more computer-readable storage media which may be non-transitory, such as RAM, ROM, EEPROM, EPROM, flash memory devices, magnetic disks, etc., and combinations thereof. The memory 154 can store data 156 and instructions 158 which are executed by the processor 152 to cause the training computing system 106 to perform operations. In some implementations, the training computing system 106 includes or is otherwise implemented by one or more server computing devices (e.g., the server computing system 104).

The training computing system 106 can include a model trainer 160 that trains the machine-learned models 120 and/or 140 stored at the client computing system 102 and/or the server computing system 104 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, user-generated modular spaces (e.g., user-generated spaces 310 and 312 in FIG. 3). User-generated modular spaces can include components, component tags, component cross functionality, and/or space descriptions.

In some implementations, if the user has provided consent, the training examples can be provided by the client computing system 102. Thus, in such implementations, the model 120 provided to the client computing system 102 can be trained by the training computing system 106 on user-specific data received from the client computing system 102. In some instances, this process can be referred to as personalizing the model.

The model trainer 160 includes computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 108 can be any type of communications network, such as a local area network (e.g., intranet), wide area network (e.g., Internet), or some combination thereof and can include any number of wired or wireless links. In general, communication over the network 108 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. The semantic intent output may comprise at least one word or phrase determined from the text or natural language data. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some implementations, the machine-learned models can be deployed on-device. For example, one or more components of a predictive machine-learned model or pipeline can be deployed on-device to avoid the upload of potentially sensitive information relating to the types of input, the types of device(s), or the contents of the inputs (e.g., relating to disabilities, contact information, address, etc.) to a server. For example, the server computing system can send a form with a learned context vector describing one or more input fields associated with a component (e.g., portion of an application associated with performance of a processing task). An onboard client model associated with the client computing system 102 can input local client characteristics (e.g., obtained via the user input component 122) and a context vector to generate a composed modular application. This on device processing can increase data privacy for a user. In some embodiments, this can also reduce the amount of data transmitted off-device, thereby reducing bandwidth usage.

Example Model Arrangements

Figure 2:
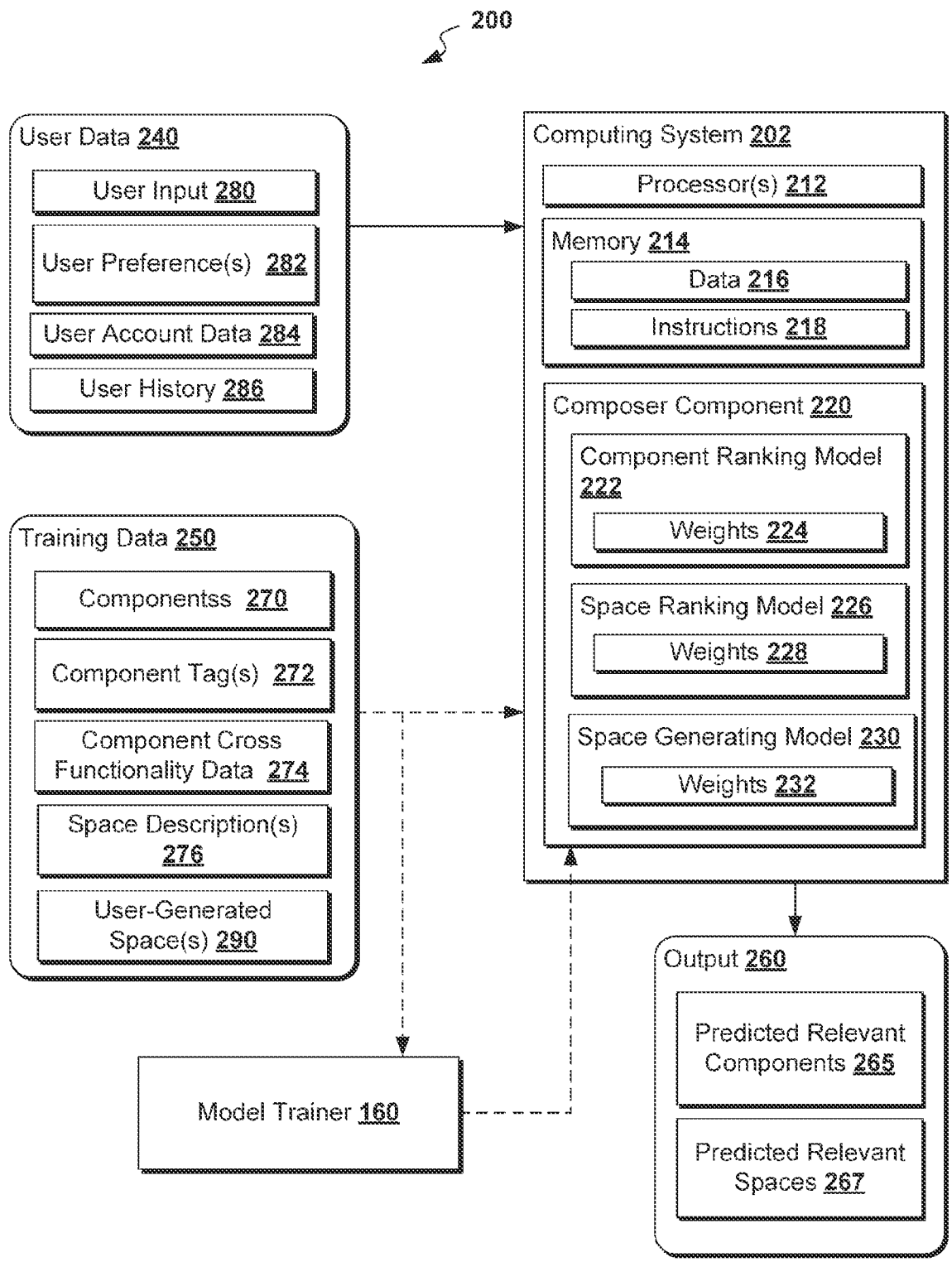
FIG. 2 depicts a block diagram associated with machine-learned model(s) according to example embodiments of the present disclosure.

FIG. 2 depicts one example system 200 for retrieving and generating composed modular application spaces according to example aspects of the present disclosure. The example system 200 contains a computing system 202. The computing system 202 can be any type of system of one or more computing devices (e.g., client computing system 102, server computing system 104, etc.). A computing device can be, for example, a personal computing device (e.g., laptop or desktop), a mobile computing device (e.g., smartphone or tablet), a gaming console or controller, a wearable computing device, an embedded computing device, a server computing device, a node of a distributed computing device, a virtual instance hosted on a shared server, or any other type of computing device. In some embodiments, the computing system 202 includes a plurality of computing devices interconnected via a network or otherwise distributed in an interoperable manner. For example, the computing system 202 can include a server for serving content over a network (e.g., network 108). For instance, the computing system 202 can include a web server for hosting web content, for collecting data regarding web content (e.g., for receiving, monitoring, generating, or otherwise processing data regarding web content, such as the use, download of, and/or interaction with web content).

The computing system 202 can contain processor(s) 212 and memory 214. The one or more processors 212 can be any suitable processing device (e.g., a processor core, a microprocessor, an ASIC, an FPGA, a controller, a microcontroller, etc.) and can be one processor or a plurality of processors that are operatively connected. The memory 214 can include one or more computer-readable storage media which may be non-transitory, such as RAM, ROM, EEPROM, EPROM, flash memory devices, magnetic disks, etc., and combinations thereof. The memory 214 can store data 216 and instructions 218 which are executed by the processor 212 to cause the computing system 202 to perform operations.

In some implementations, the computing system 202 can store or otherwise implement one or more machine-learned models of a machine-learned model framework. In some embodiments, the composer subsystem 220 comprises a three-model machine-learned model framework. In some embodiments the composer subsystem comprises no machine-learned model framework and/or any combination of component ranking model 222, space ranking model 226, and space generating model 230. The machine-learned model framework can include a machine-learned component ranking model 222 (e.g., with learnable weights 224), a machine-learned space ranking model 226 (e.g., with learnable weights 228), and/or a machine-learned space generating model 230 (e.g., with learnable weights 232). In some embodiments, the composer component 220 can implement a single model that implements component ranking, space ranking, space generation, and/or any combination (e.g., by combining one or more aspects of the component ranking model 222, space ranking model 226, and/or space generating model 230, by training a single model to obtain the desired outputs directly, etc.). One or more of the machine-learned models can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

Embodiments of the example system 200 may be configured, as shown in FIG. 2, to process a user data 240. Responsive to processing the user data 240, the computing system 202 can provide output 260. Output 260 can include predicted relevant components 265 and/or predicted relevant spaces 267. Based on the predicted relevant components 265 and the predicted relevant spaces 267, the system can rank the components and relevant spaces. The system can provide for display the ranked components and/or ranked spaces. Additionally, or alternatively, the system can compose system-generated spaces comprising a plurality of components. The machine learned models can be trained using training data 250. This data can include, for example, components 270, component tag(s) 272, component cross functionality data 274, space description(s) 276, user-generated space(s) 290 etc.

In some embodiments, the user data 240 is entered into an input interface of the computing system 202. For example, in some embodiments, the composer component subsystem 220 can be configured to process user data 240 as input to the computing system 202. In some embodiments, the user data 240 can be implicit in the structure and/or configuration composer component subsystem 220. For example, the composer component subsystem 220 can be configured to generate predicted relevant components 265 and predicted relevant spaces 267 in response to user input and contextual data based on data indicative of user-generated spaces 250 and prior user sessions.

In some implementations, the notification element machine-learned model is trained to receive a set of input data (e.g., data indicative of user data 240) descriptive of user input and, in response, provide output data (e.g., predicted relevant components 265 and predicted relevant spaces 267) indicative of one or components and/or spaces to be rendered via a user interface. For instance, FIG. 2 illustrates the machine-learned model performing inference along the solid lines, with an example training flow illustrated along the dashed lines.

In some implementations, the input data can include one or more features that are associated with an instance or an example. In some implementations, the one or more features associated with the instance or example can be organized into a feature vector. In some implementations the output data can include one or more predictions. Predictions can also be referred to as inferences. Thus, given features associated with a particular instance, the machine-learned model can output a prediction for such instance based on the features.

The machine-learned model can be or include one or more of various different types of machine-learned models. In particular, in some implementations, the machine-learned model can perform classification, regression, clustering, anomaly detection, recommendation generation, and/or other tasks.

In some implementations, the user data 240 includes user input 280 (e.g., indicative of a current user session), user preferences 282, user account data 284, and/or user history 286. In some embodiments, user data 240 can include instances of substantially any kind or type of data that may be descriptive of various phenomena. In general, an instance refers to a set of one or more data values grouped together to describe a particular subject or subject matter. For example, an instance can be a feature vector. An instance can be associated with image data (e.g., a feature vector for an image, a hashed image, etc.). An instance can be associated with a measurement or other data collection event (e.g., at a particular time, or of a particular subject, or using a particular device, or from a particular perspective, etc.). An instance can be associated with a network session, such as a set of interactions with a web server. In some embodiments, an instance can be associated with a user's interaction with web content (e.g., anonymous or identified).

In some embodiments, the notification element subsystem 220 can be trained using reinforcement learning. For example, a training dataset comprising historical user input, and user-generated spaces can be used to train composer component subsystem. In response to obtaining user data, the system can determine a ranking of components, a ranking of spaces, and/or one or more automatically composed spaces. The system can learn appropriate weights based on receiving a reward for predicted notification elements that increase user interaction or other data indicative of a correlation between output 260 and an indication of meeting a user intent. As used herein, the intent may comprises one or more keywords or phrases corresponding to, or related to, the user input data. For example, the intent may be a word or phrase which is associated with one or more words or terms in the user input data. In some implementations, the composer component subsystem 220 can be a machine-learned model. The training data 250 and user interaction data can be used by a model trainer 160 to train the notification element subsystem 220.

The trained model can be used to predict relevant components and relevant spaces which can in turn be used to rank one or more candidate components, rank one or more candidate spaces, and/or generate one or more spaces. In some embodiments, a simulated user model can be trained using the training data to generate simulated inputs according to patterns learned from the training data. The simulated user model can, in some instances, provide a simulated environment in which the reinforcement learning agent, the notification element subsystem, can be trained.

Example Methods

Figure 3:
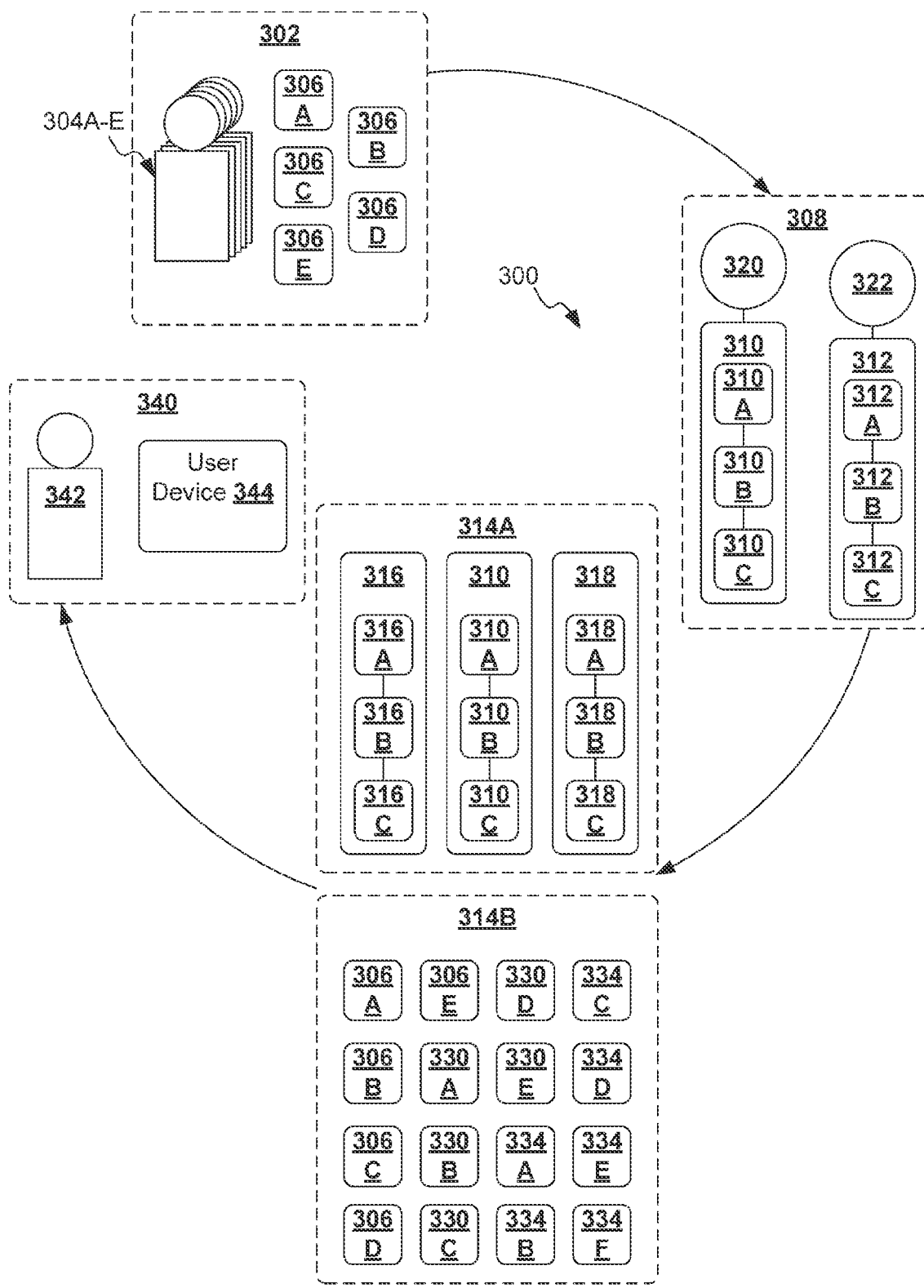
FIG. 3 depicts an example process flow according to example embodiments of the present disclosure.

FIG. 3 depicts an example method for indexing, retrieving, ranking, and obtaining components (e.g., components 142A-E) and/or spaces. First stage 302 depicts a plurality of developers 304A-E. Developers 304A-E can generate respective components 306A-E. In some embodiments, each component can be associated with a processing task. For example, the processing task could include time keeping, booking, calendar, messaging, appointments, reminders, videos, photographs, etc. In some implementations, developers 304A-E can generate new components to be combined with other components to create spaces. Additionally, or alternatively, developers can deconstruct existing applications, websites, etc. to isolate particular processing tasks, functionalities, and/or portions of existing applications to be combined with other components to generate spaces (e.g., modular application spaces).

In some embodiments, each item 306A-E (e.g., components 142A-E) can be associated with component data (e.g., component data 144A-E). The component data can include one or more tags. The one or more tags can be automatically generated (e.g., via a machine-learning process) and/or manually tagged. The system can obtain input data indicative of one or more tags associated with a component. For example, developers 306A-E can generate components 306A-E. For example, component 306A can be associated with a ride share functionality and component 306B can be associated with a restaurant reservation booking functionality. Developer 304A can be a ride share application developer who developed component 306A. Develop 304B can be a restaurant reservation application developer who developed component 306B. Developer 304A can add tags to component 306A to indicate that the application is for ride share services. For example, additional tags can be generated based on input fields associated with component 306A. For example, component 306A could include an input field for pick-up and drop-off location, user account information, etc. Because of the input fields of the associated component 306A, the system can automatically generate one or more tags indicative of the functionality of the component 306A, a category of the component 306A, and/or any other data associated with the component 306A.

The second stage 308 can include one or more users (e.g., user 320) and user 322) and/or services assembling components to generate a plurality of user-generated modular application spaces (e.g., space 310, space 312, etc.). A first user-generated modular application space 310 can include a first component 310A, a second component 310B, and a third component 310C. As will be depicted in example user interfaces in FIGS. 5-18, the components can include a plurality of functionalities (e.g., capabilities of processing tasks) which can be combined by a user to facilitate a user intent. Each respective component within the first user-generated modular application space 310 can include one or more tags. The system can use the one or more tags and/or the combination of components to determine that the components (e.g., components 310A-310C) are related (e.g., semantically related). The system can generate an index (e.g., component index 340) to store data indicative of the plurality of components and/or data indicative of relationships between the plurality of components.

In some embodiments, a second user-generated modular application space 312 can be composed by a user (e.g., user 322) including a first component 312A, a second component 312B, and a third component 312C. As will be depicted in example user interfaces in FIGS. 5-18, the components can include a plurality of functionalities which can be combined by a user to achieve a goal. Each component within the first user-generated modular application space 312 can include one or more tags. The system can use the one or more tags and/or the combination of components to determine that the components (e.g., components 312A-312C) are related (e.g., semantically related). The system can generate an index (e.g., component index 140) to store data indicative of the plurality of components and/or data indicative of relationships between the plurality of components.

In the third stage 314A and 314B, a plurality of modular application spaces 316, 310, 318, etc. can be indexed and/or sorted according to data associated with the modular application spaces. For example, the modular application spaces can include a first-user generated modulated application space 310. The modular application spaces can include automatically composed modular application spaces (e.g., space 316, space 318, etc.). Space 316 can include components 316A-316C. Space 318 can include components 318A-C. The spaces (e.g., space 316, 310, 318) can be edited and/or modified by an end user. Additionally, and/or alternatively the one or more spaces can include more and/or less components than depicted.

The system can parse component index (e.g., component index 140) in response to obtaining user input data indicative of a query. In response to obtaining the user query, the system can classify the query and determine contextual data associated with the user session within which the user query was obtained. In response to the classification of the query and contextual data, the system can parse the component index and space index to identify one or more predicted relevant components, identify one or more predicted relevant spaces, and/or automatically generate one or more modular spaces. The system can rank the predicted relevant spaces (e.g., user-generated spaces, automatically generated spaces) and provide the ranked items for display to a user (e.g., in third stage 314A).

The third stage 314B can include a plurality of components. The components in 314 can be indexed and/or ranked according to data associated with components. For example, the components can include components generated by one or more developers (e.g., components 306A-E), components automatically generated by the system (e.g., components 330A-E, and/or components that are generated by isolating functionalities (e.g., processing tasks) of existing applications to generate components (e.g., components 334A-F) be used in a cross-application and/or cross-functionality environment (e.g., modular application space).

The system can parse component index (e.g., component index 140) in response to obtaining user input data indicative of a query. In response to obtaining the user query, the system can classify the query and determine contextual data associated with the user session within which the user query was obtained. In response to the classification of the query and contextual data, the system can parse the component index to identify one or more predicted relevant components. The system can rank the predicted relevant components and provide the ranked items for display to a user (e.g., in third stage 314B).

A fourth stage 340) can include a user 342 and an associated user device 344. In some embodiments, the user can engage with a user interface. For example, the user 342 can provide input via a user interface. The system can obtain data indicative of a user input (e.g., indicative of a search, query, and/or request). The system can process the request to determine an intent associated with the user input. As described herein, the intent may comprise one or more keywords or phrases corresponding to, or related to, the user input data. For example, the intent may be a word or phrase which is associated with one or more words or terms in the user input data. As described in FIG. 2, the system can predict relevant components and predict relevant spaces in response to obtaining data indicative of user input and parsing the component index data. The system can cause for display one or more components and/or modular spaces (e.g., generated by a user and/or automatically generated by the system). The system can rank the one or more components and/or modular spaces and cause them to be displayed based on the rank.

Figure 4:
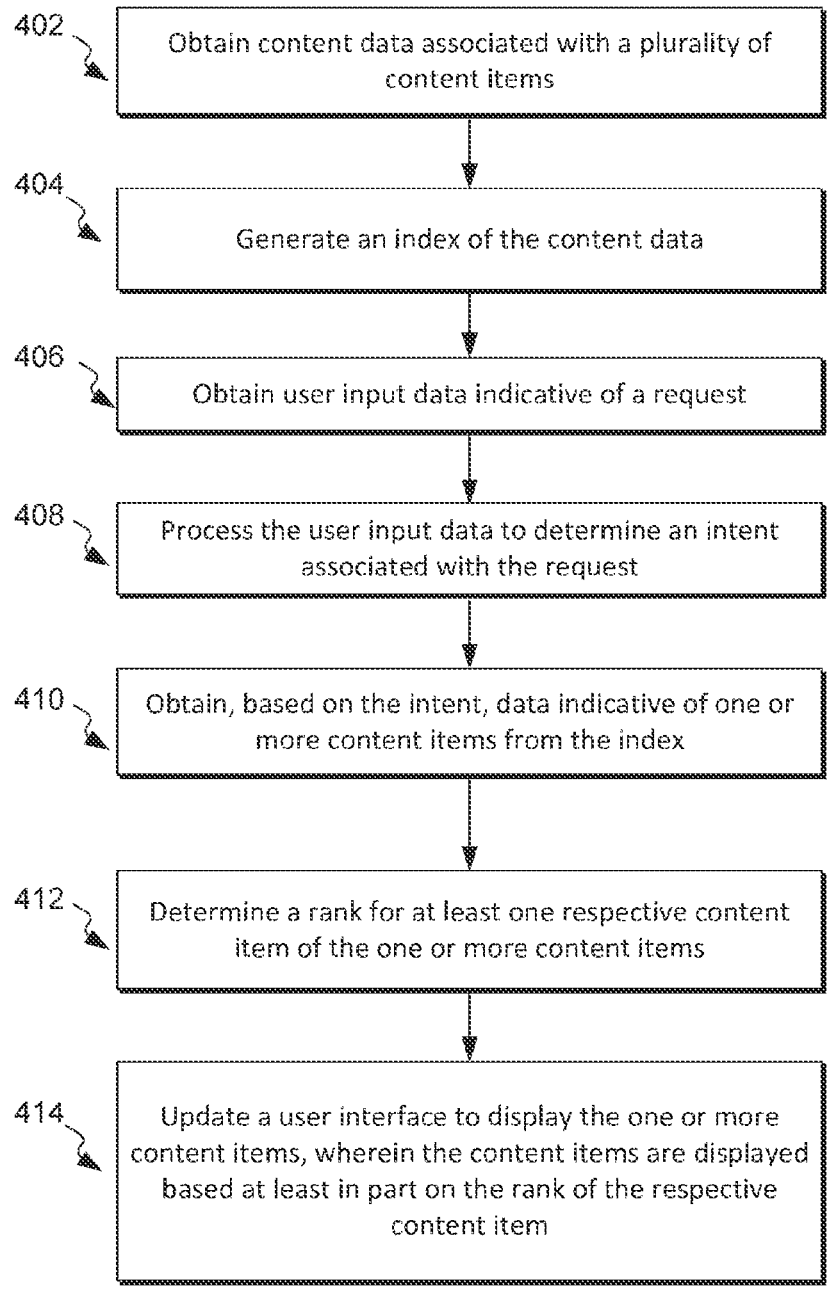
FIG. 4 depicts a flowchart of an example method according to example embodiments of the present disclosure.

FIG. 4 depicts a flow chart diagram of an example method to perform retrieval and composition of modular application spaces according to example embodiments of the present disclosure. Although FIG. 4 depicts steps performed in a particular order for purposes of illustration and discussion, the methods of the present disclosure are not limited to the particularly illustrated order or arrangement. The various steps of method 400 can be omitted, rearranged, combined, and/or adapted in various ways without deviating from the scope of the present disclosure.

At (402), a computing system can obtain component data associated with a plurality of components. As described herein the method can include obtaining component data associated with a plurality of components. By way of example, component data can include data indicative of one or more components.

At (404), a computing system can generate an index of the component data. As described herein the method can include generating an index of the component data. By way of example, the system can generate an index comprising a knowledge graph containing component data of associated components. In some examples the system can generate an index of composed spaces comprising one or more components composed into a modular composition. In some implementations, the composed space can have associated data. The system can generate an index with composed space data.

At (406), a computing system can obtain user input data indicative of a request. As described herein the method can include obtaining user input data indicative of a request. By way of example, data can be obtained via user input. A user can provide input through any means including touch, keyboard, audio, gesture, visual, etc. For example, the user can provide input via a user interface of a user device. The system can obtain data indicative of the user input. The data indicative of the user input can include a request. In some implementations the request can be a search request, a request to perform an action, a request to provide a functionality, etc.

At (408), a computing system can process the user input data to determine an intent associated with the request. As described herein the method can include processing the user input data to determine an intent associated with the request. The intent may comprise one or more keywords or phrases corresponding to, or related to, the user input data. For example, the intent may be a word or phrase which is associated with one or more words or terms in the user input data. By way of example, the system can maintain data enclaves comprising user data. The data enclaves can prevent access to user data from third parties. The computing system can obtain requests from component components for access to the user data. The computing system can provide limited access to user data. Thus, the data enclave can increase user privacy by preventing unauthorized access to user data and prevent the unnecessary sharing of user data for processing that can occur on device and/or within a data enclave on a cloud associated with a user account.

In some implementations, the system can provide limited access to user data. For example, the system can obtain portions of functionality associated with the component components. The system can determine necessary user data for performing the portions of functionality. The system can provide access to the necessary user data to perform the portions of functionality. The system can process, within the data enclave, the user data and the portions of functionality. The system can perform the portions of functionality using the accessed user data. In some implementations, the portion of functionality can include at least one of: (i) coordinating scheduling for a user, (ii) causing media to play, (iii) coordinating a user placing an order, (iv) coordinating a leg of travel for a user, (v) providing location specific information, (vi) providing a link or preview of third-party content, (vii) providing an input component, or (viii) providing means for controlling items associated with the user. The user data can include data indicative of at least one of (i) one or more user preferences, (ii) user account data, or (iii) user history.

At (410), a computing system can obtain, based on the intent, data indicative of one or more components from the index. As described herein the method can include obtaining, based on the intent, data indicative of one or more components from the index.

At (412), a computing system can determine a rank for at least one respective component of the one or more components. As described herein the method can include determining a rank for at least one respective component of the one or more components. By way of example, the respective component can include a functionality. The functionality can include at least one of a functionality generated by a user or a functionality generated by a developer. For example, a functionality can be associated with a bit of code which causes a system to perform an action and/or processing task. The functionality can be created to stand on its own and/or can be extracted from an existing application. In some implementations, the respective components can include an application.

In some embodiments, determining the rank for at least one of the respective components is based on at least one of: (i) one or more user generated spaces, (ii) semantic processing of relationships between a plurality of components in a user generated space, (iii) the index of the component data, or (iv) prediction of a relationship between a plurality of candidate components.

In some implementations, determining the rank can be performed by a machine-learned model. The system can generate an index of the one or more user generated spaces. The system can train the machine-learned model using the index of the one or more user generated spaces. For example, the machine-learned can learn relationships between paired components to determine user intent associated with pairing the responses. The system can store the data in the form of component tags which can be used by the system to identify one or more relevant components in response to obtaining user input indicative of a request. The semantic processing of the relationship between the plurality of components in the user generated space can include obtaining data indicative of a plurality of components associated with the user generated space. The semantic processing of the relationship between the plurality of components in the user generated space can include updating, based on the data indicative of the plurality of components, the index of the component data.

In some embodiments, the data indicative of the plurality of components associated with the user generated space comprises at least one of: (i) data indicative of cross-functionality of the one or more components associated with the user generated space, (ii) data indicative of one or more tags associated with the respective components associated with the user generated space, or (iii) data indicative of a description of the user generated space. The one or more tags can include a label of at least one of a component type, subject matter, or associated intent. The data indicative of the description of the user generated space can include a user-generated description of the intent associated with the user generated space. The data indicative of the description of the user generated space can include an intent generated by a machine-learned model indicative of an intent associated with the user generated space. For example, a user can compose a space. The user can provide a description indicative of why the space was created, why certain components were combined, the expected functionality, the expected benefits, etc. of the space. The user can explicitly provide an intent associated with the space. Additionally, or alternatively, the system can automatically generate an intent associated with the user generated space based at least in part on a processing of the user generated description (e.g., natural language processing, etc.)

At (414), a computing system can update a user interface to display the one or more components, wherein the components are displayed based at least in part on the rank of the respective component. As described herein the method can include updating a user interface to display the one or more components, wherein the components are displayed based at least in part on the rank of the respective component. By way of example, the system can cause a plurality of individual components to be displayed. Additionally, or alternatively, the system can provide for display spaces composed of a plurality of components.

Example User Interfaces

FIGS. 5-17 depict various example user interfaces and portions of user interfaces according to example embodiments of the present disclosure. For example, the following figures represent graphical user interface depictions of components and composed spaces as described in FIGS. 1-4.

Figure 5A:
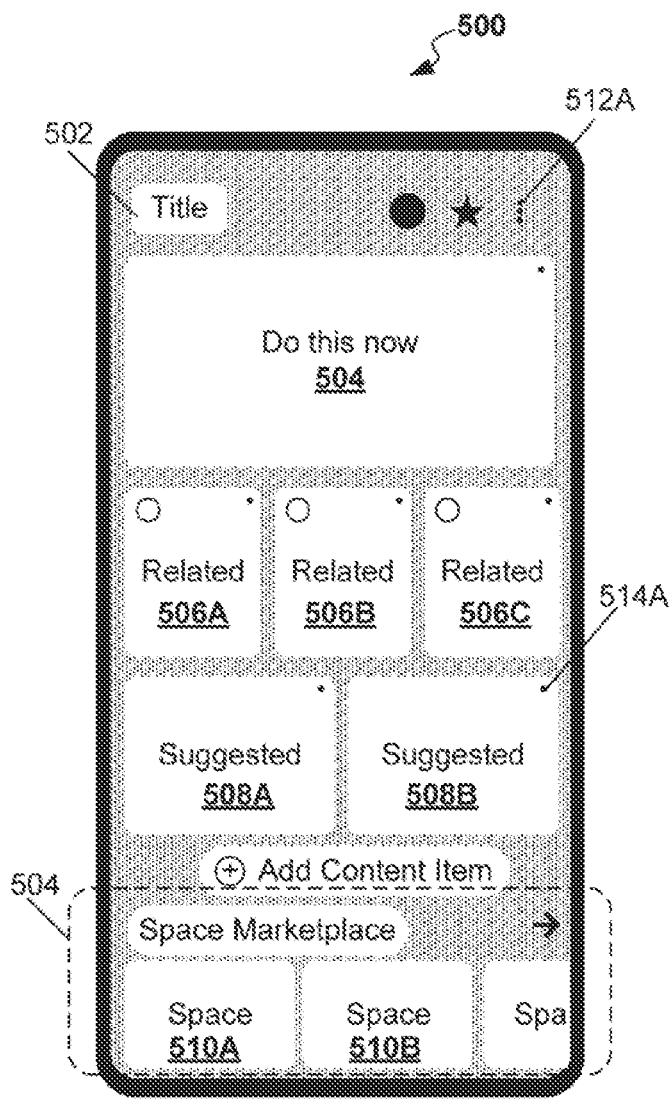
FIG. 5A depicts a user interface according to example embodiments of the present disclosure.

FIG. 5A depicts an example user interface. The user interface can be a templated user interface. The templated user interface can be used as an outline for the system to determine how to combine one or more components within a space and/or can provide a template for a user to compose a space. The user interface 500 can include a title 502, an intent 504, related components 506A-C, suggested components 508A-B, spaces 510A-B in a space marketplace, setting menu 512 and setting menu 514.

For example, the title 502 can be updated by the system in response to receiving data indicative of user input indicative of a title. In some implementations, the title can be a title associated with an action a user desires to perform, for example the title can include Good Heart, Meal Planner, On the Go, Daily Routine, Moodsetter, Travel Style, etc. Additionally, or alternatively, the title can be descriptive of one or more components (e.g., related components 506A-C, suggested components 508A-B). In some implementations, the system can provide for display one or more related components 506A-C that are associated with an intent 504. Additionally, or alternatively, the system can cause for display suggested components 508A and 508B.

Figure 5B:
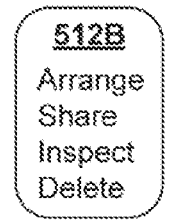
FIG. 5B depicts a sub element of a user interface according to example embodiments of the present disclosure.
Figure 5C:
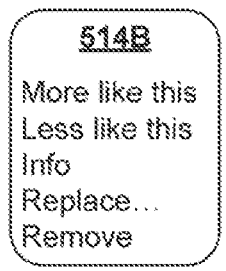
FIG. 5C depicts a sub element of a user interface according to example embodiments of the present disclosure.

The system can obtain user input indicative of selection of a setting menu 512A related to the user-generated space. Turning to FIG. 5B, the selection of the setting menu 512A can cause a setting menu 512B to appear within the user interface. The setting menu 512B can include a plurality of options comprising actions related to user interface 500. For example, the actions can include selectable options including (i) arrange, (ii) share, (iii) inspect, (iv) delete. The system can obtain data indicative of user selection of one of the options. The system can respond to the user selection. For example, in response to obtaining data indicative of the selection of "arrange", the system can update the intent 504, related components 506A-C, and suggested components 508A-B from a static state to a dynamic state. The dynamic state can allow the user to reposition the respective items by providing user input indicative of selection and repositioning of one or more items within user interface 500. For example, in response to obtaining data indicative of the selection of "share", the system can provide the user with options to share the user composed space (e.g., as depicted in user interface 500) with other users. This sharing can occur via a message, sharing through a cloud, sharing through social media, via publishing to a space marketplace, etc. For example, in response to obtaining data indicative of the selection of "inspect", the system can determine if there are any errors with interoperability of the one or more related components 506A-C and suggested components 508A-B. For example, in response to obtaining data indicative of the selection of "delete", the system can delete the entire user generated space.

Turning to FIG. 5B, the system can obtain user input indicative of a selection of a setting menu related to the related and/or suggested components. For example, a user can select a settings menu 514A associated with suggested component 508B. The system can cause the setting menu 514B to be displayed within the graphical user interface. The setting menu 514B can include a plurality of options comprising actions related to suggested component 508B which the system can perform. For example, the actions can include selectable options including (i) more like this, (ii) less like this, (iii) info, (iv) replace, and/or (v) remove. The system can obtain data indicative of user selection of one of the options. The system can respond to the user selection. For example, in response to obtaining data indicative of the selection of "more like this", the system can determine one or more items that are similar to suggested component 508B to display. For example, in response to obtaining data indicative of the selection of "less like this", the system can determine one or more items that are similar to suggested component 508B to prevent from being displayed. For example, in response to obtaining data indicative of the selection of "info", the system can provide for display information associated with suggested component 508B. For example, in response to obtaining data indicative of the selection of "replace", the system can remove suggested component 508B and cause a new component to be displayed in the same location on the user interface. For example, in response to obtaining data indicative of the selection of "remove", the system can remove suggested component 508B. In some implementations, the system can provide for display a user input that can obtain selection data from the user to add a component to the user interface location that was previously occupied by component 508B.

The user interface can also include a space marketplace 504 which can include a plurality of spaces (e.g., space 510A and space 510B). The spaces can include user-generated spaces and/or machine-learned model generated spaces. In response to obtaining data of a user selection of one of the spaces, the system can transmit data which causes the space to display on user interface 500.

Figure 6:
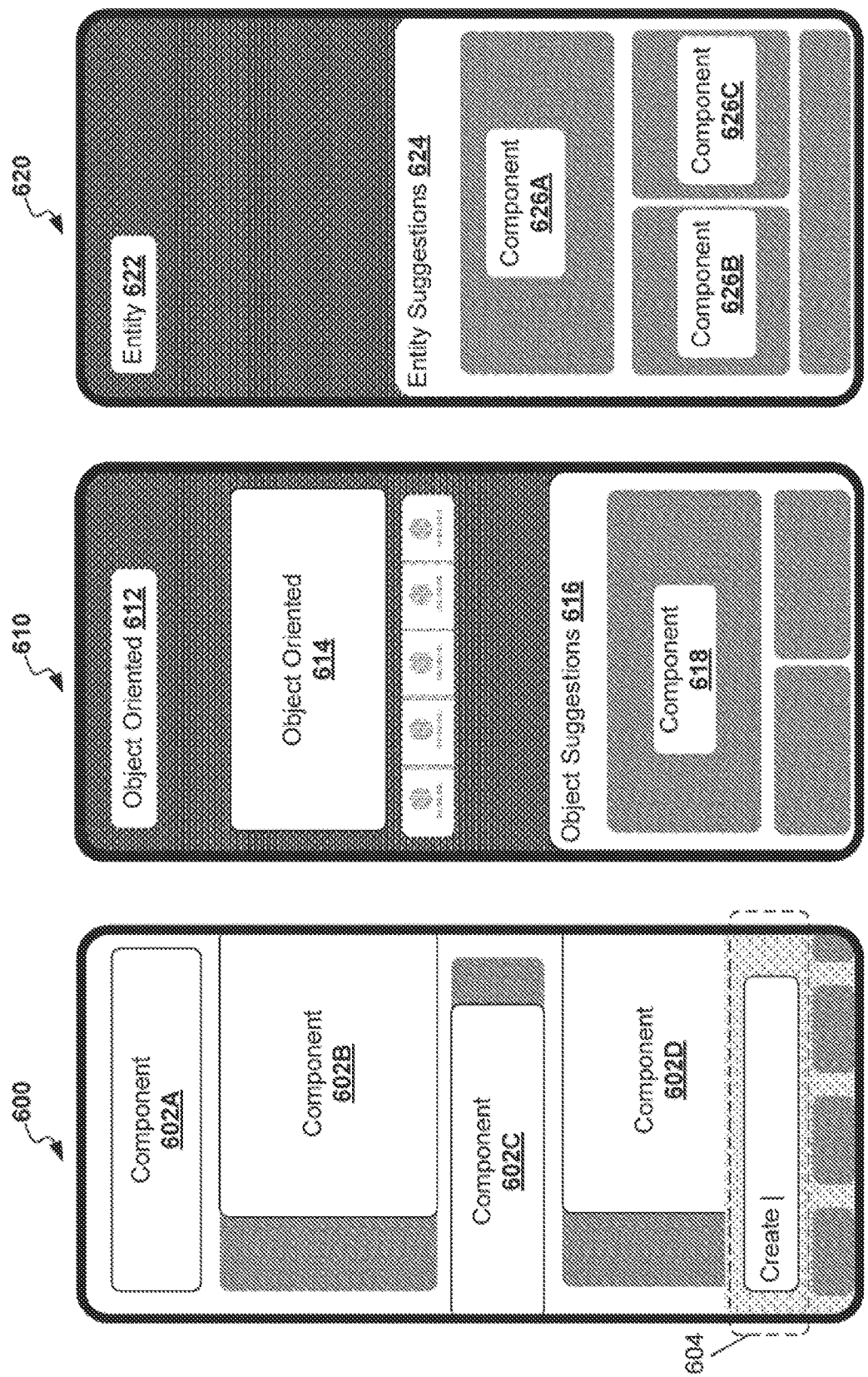
FIG. 6 depicts user interfaces according to example embodiments of the present disclosure.

FIG. 6 depicts several example space compositions. In some implementations, space compositions can vary based on user intent. For example, space one 600 can be associated with at least one of a search, question, or desire to compose, space two 610 can be an object-oriented user input, and space three 620 can be an entity-sense space. For example, space one 600 includes a plurality of components 602A-D. As described herein, the components 602A-D can include applications, portions of applications associated with performing processing tasks, portions of code that can cause the system to perform processing tasks, snippets of code which cause the system to perform a functionality, etc. Space one 600 includes an input component 604 which can be used by the system to obtain data indicative of a search and/or request from a user. For example, the search can include a string of terms submitted by a user indicative of a user intent. For example, a user intent can be determined by the computing system using natural language processing techniques to extract terms and characteristics of the user input. The system can parse a search index to locate a plurality of items that are responsive to the user input.

Example space two 610 can include an object-oriented space. For example, the computing system can determine that the user's intent is associated with a particular object and thus the title of the space 612 is "object oriented". The object-oriented space can include a plurality of components including object-oriented component 614, object suggestions 616, and one or more components (e.g., including components 618).

Example space three 620 can be an entity-sensed space. For example, the computing system can determine that the user is viewing content associated with a particular entity. In response to detecting the mention of the entity (e.g., via 622), the system can generate entity suggestions 624. The entity suggestions can include a plurality of components 226A-D. The plurality of components 226A-D can include components directly related to the entity and/or components that the system has determined are relevant to the entity.

Figure 7:
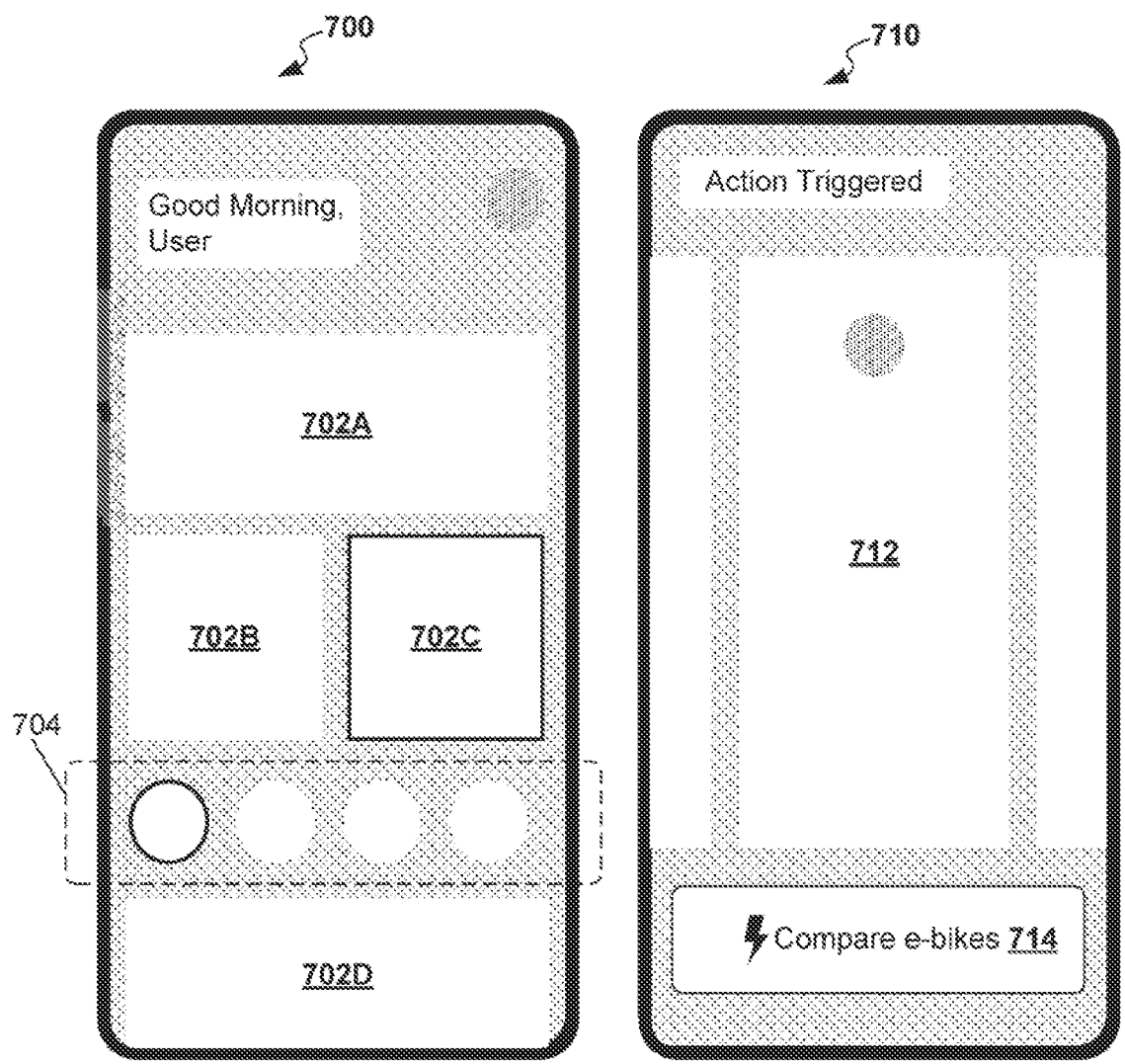
FIG. 7 depicts user interfaces according to example embodiments of the present disclosure.

FIG. 7 depicts two additional user interfaces. User interface 700 depicts a feed/suggestion page. For example, this user interface could be depicted upon a user logging into a user device. In response to the user logging on to the device, the user may request a space for a particular purpose. For example, the system can obtain user input (e.g., via a keyboard, via audio input, etc.) indicative of a user stating. "Start a Space for____." In response, the system can generate a blank template as depicted by user interface 700. User interface 700 can be personalized based on suggested components, user input indicative of selection of one or more components to be part of the space (e.g., in one or more available content slots 702A-D), and/or indication of users and/or publishers (e.g., 704) that may have associated relevant spaces.

User interface 710 depicts an example of an action-triggered space. For example, a user can be interacting with a plurality of applications and/or websites. The system can determine that there is a pattern of opening and shutting applications. The system can determine that this behavior is generally associated with shopping for a particular item. In response to obtaining this data, the system can generate an action-triggered space. The action triggered space can include, for example, a plurality of embedded web pages, processing tasks, and/or other functionalities that allow for purchase completion 712. Additionally, or alternatively, the system can provide for display one or more user input interface elements (e.g., interface element 714). The system can obtain data indicative of a user selecting or otherwise interacting with interface element 714. In response, the system can provide a results page. For example, the results page can include a comparison of a plurality of e-bikes. It is important to note, that unlike existing models which would cause the user interface to transfer into an additional/separate application, the current disclosure relates to the ability to update the user interface within the same space to present components to a user in a seamless manner.

Figure 8:
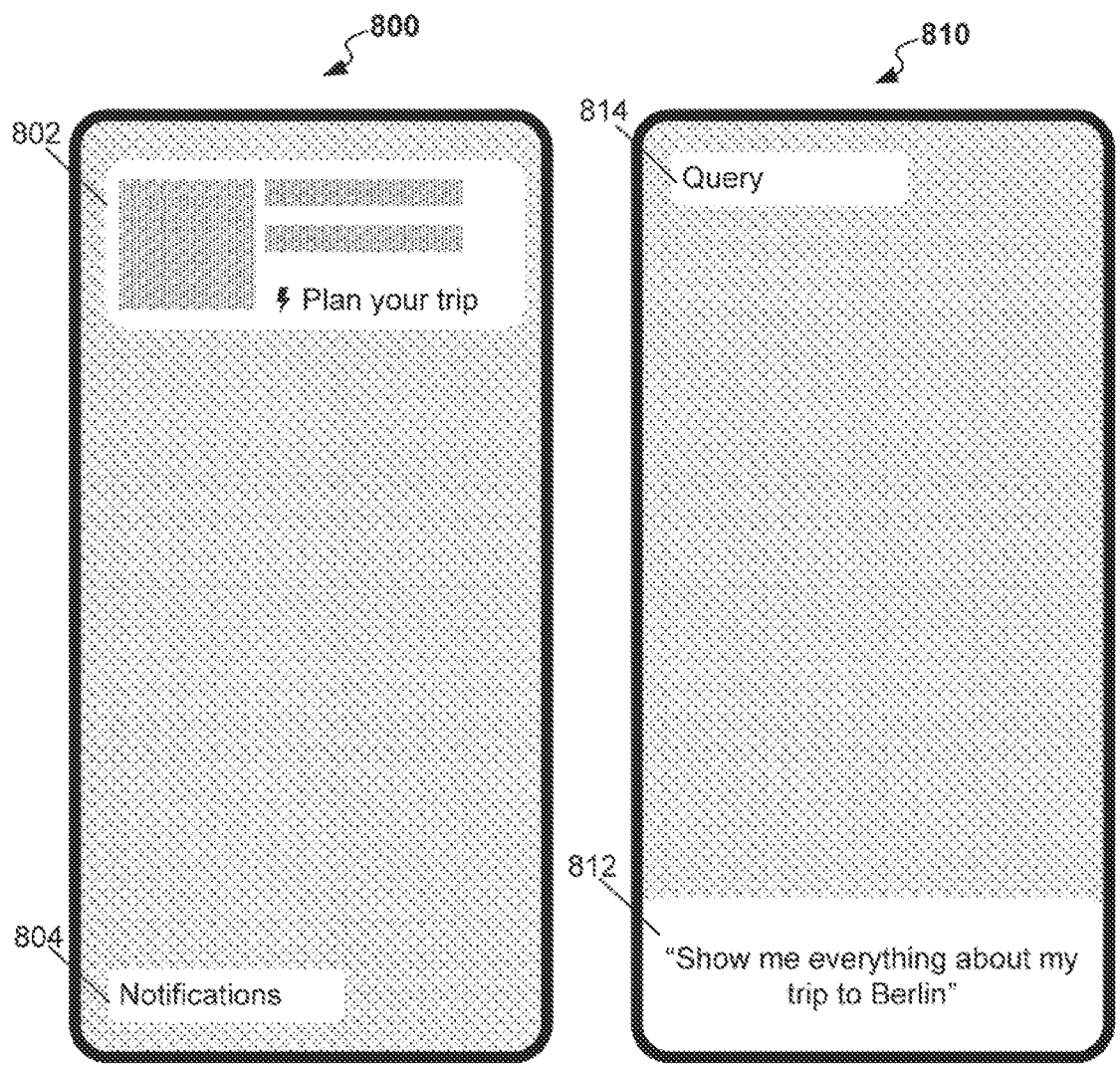
FIG. 8 depicts user interfaces according to example embodiments of the present disclosure.
Figure 9:
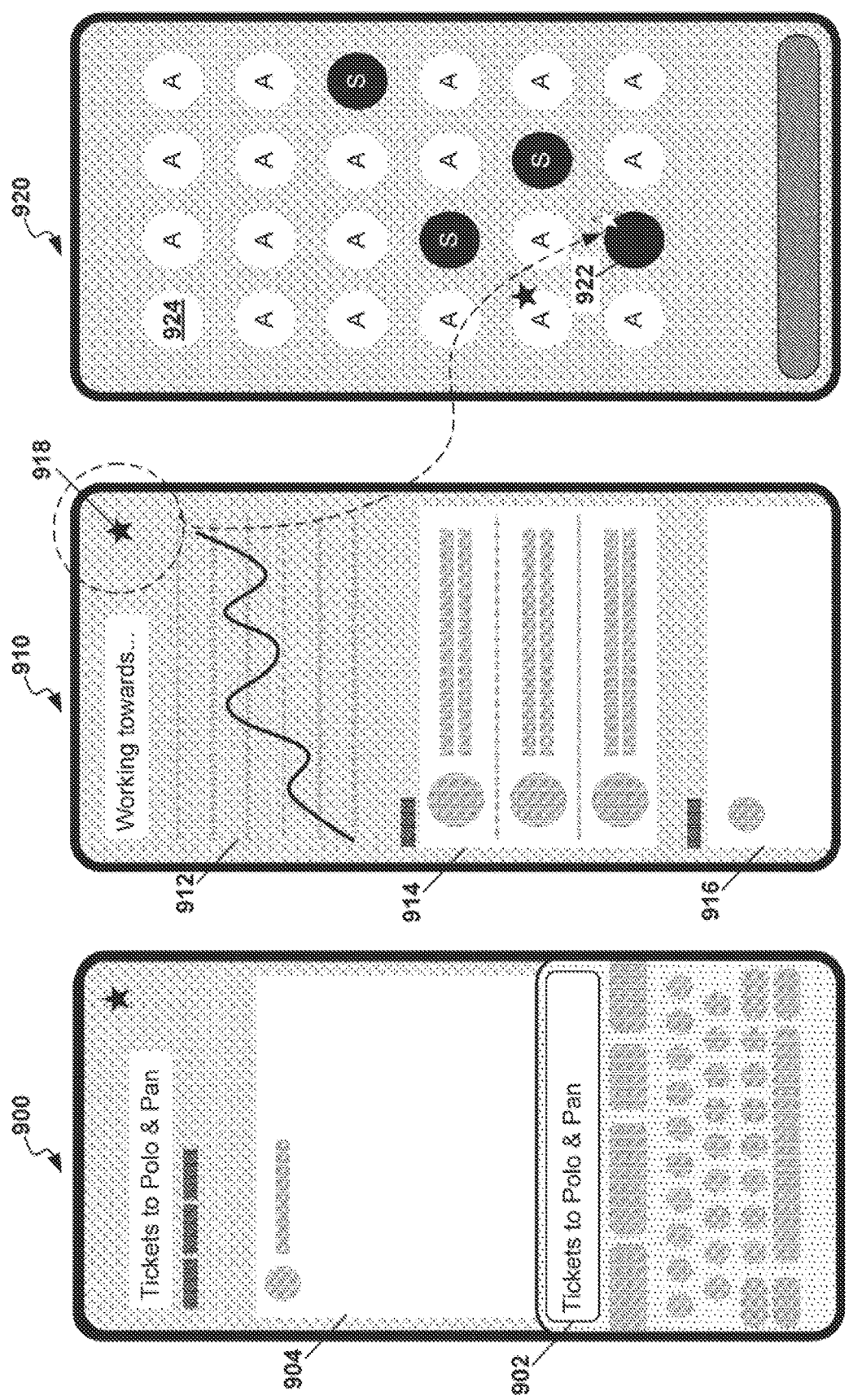
FIG. 9 depicts user interfaces according to example embodiments of the present disclosure.

FIG. 8 depicts two example user interfaces 800 and 810. For example, user interface 800 can be a space associated with travel. For example, a user can be planning a trip. The system can determine the user's intent to plan a trip via an explicit representation by the user (e.g., obtaining user input data indicative of a request for spaces related to travel) and/or implicit representations (e.g., a user searching for flights, hotels, etc.). In response to determining that the user is planning a trip, the system can provide a plan your trip component 802 and a notification 804. In some implementations the notification 804 can comprise a message to the user regarding the trip. For example, the message could include "Flights are cheap right now!", "Book your hotel now and save!", etc.

User interface 810 depicts an example of a composer interface obtaining audio input. In some embodiments, the system can obtain user input comprising a request 812. The user input can be in the form of audio input. For example, the user can say, "Show me everything about my trip to Berlin." The composer component can obtain the query 814 and in response retrieve and/or generate a space composed of components relevant to the user's trip to Berlin.

As described herein, spaces (e.g., example depictions in FIGS. 5-18) can be ephemeral by nature. In some embodiments, the system can generate a space at any time. For example, as depicted in example user interface 900, the system can obtain a user request 902 for "Tickets to Polo & Pan." In response, the system can generate a space in real-time comprising a plurality of components. The components can include components which the user can interact with within the space. For example, the components can include component 904. Component 904 could be a component capable of performing a processing task. For example, the processing task could be completing a purchase for tickets for a user. Component 904 could contain various ticket location options and price points and could have interface elements that the user can interact with to complete a purchase of tickets.

However, a user may prefer for a space to be presented in a familiar manner. In some implementations a space can be "pinned" like an application to a user device home screen. For example, a user can locate space 910 in response to a query for "Working towards a healthier heart". Space 910 can include multiple components. For example, space 910 can include a first component 912 that integrates fitness tracker information (e.g., daily step count, heart rate, oxygen saturation, etc.). Space 910 can include a second component space 914 which can include a plurality of exercise courses. Space 910 can include, for example, a third component space 916 which can include one or more articles related to heart health. Space 910 can include a "pin" user interface element 918. The system can obtain user input indicative of selection of the pin user interface element 918. In response, the system can generate an application-like user interface element 922 (e.g., similar to an icon associated with an application) and pin it to a home screen 920 of the user device. As depicted in example home screen 920, the system can provide for display a plurality of application icons (e.g., application icon 924) and space icons (e.g., space icon 922). Space icon 922 can represent the space 910 which a user has "pinned" to home screen 920.

Spaces can be composed by the system and/or generated by a user. For example, FIGS. 10A-10C depict example user interfaces for adding components, removing components, and replacing components. For example, FIG. 10A depicts a user interface element 1002 which can be selected by a user to add a new component to space 1000. FIG. 10B depicts a user interface element 1012 which can be selected by a user to remove a new component to space 1010. For example, the system can obtain data indicative of a user selecting user interface element 1012, and in response the system can remove component 1014 from space 1010. FIG. 10C depicts a user interface element 1022 which can include a plurality of alternative components (e.g., component 1024 and 1026) to replace original component 1028 within space 1020. For example, the system can obtain data indicative of user selection of alternative component 1024. In response, the system can replace original component 1028 with alternative component 1024 within space 1020.

FIGS. 11A-C depict example user interfaces for collaborative and personalized spaces. In some implementations, FIG. 11A depicts space 1100 which can include a user interface element 1102 indicative of a capability of a first user 1104 to invite other users (e.g., user 1112) to collaborate on a space. For example, a user can be planning a group trip to Tokyo. The user can select user interface element 1102 which can allow the user to select one or more additional users (e.g., co-travelers) to invite to the space. As depicted in FIG. 11B, user interface 1110 can depict a collaborative space. The collaborative space can include a plurality of users (e.g., user 1112 and 1104) who each have the ability to modify the collaborative space. FIG. 11C depicts an example of personalized space. For example, a user can submit a request 1122 for "top rated restaurants in San Francisco". The system can retrieve and/or generate a space comprising a map component 1124 and a list component 1126 for restaurants located with the map component 1124. The user can have associated user preferences that the system can tailor the space to. For example, the user can have a dietary preference of "vegan" 1128. Accordingly, the system can automatically adjust the space to filter and display vegan restaurants for the user.

FIG. 12A-B depict publishing a user generated space (e.g., space depicted via user interface 1200) into a space marketplace 1202. In some embodiments, a user can generate a space and publish it to a marketplace. By publishing the space to a marketplace, the space can be indexed by the system. Thus, when another user provides a request for spaces related to the user-generated space, the system can provide the user-generated space as a result. For example, a user can generate a space entitled "Top 20 in Tokyo". The space can include a component 1202 related to Places to Eat, a map depicting sites to visit 1204, videos to watch describing tourist attractions 1206, etc. When the user indicates that they have completed composing the space, the system can provide a user interface element 1208 to "Share this Space". For example, the user can share the space with individual users (e.g., user 1208A) and/or select an option to publish 1208B the space via a space marketplace 1210. The space marketplace 1202 can include a plurality of spaces (e.g., user generated spaces and/or composer generated spaces). By way of example, the system can obtain data indicative of a user selection of space 1200A. In response to obtaining data indicative of the user selection, the system can provide for display the user-generated space depicted via user interface 1200.

Figure 13A:
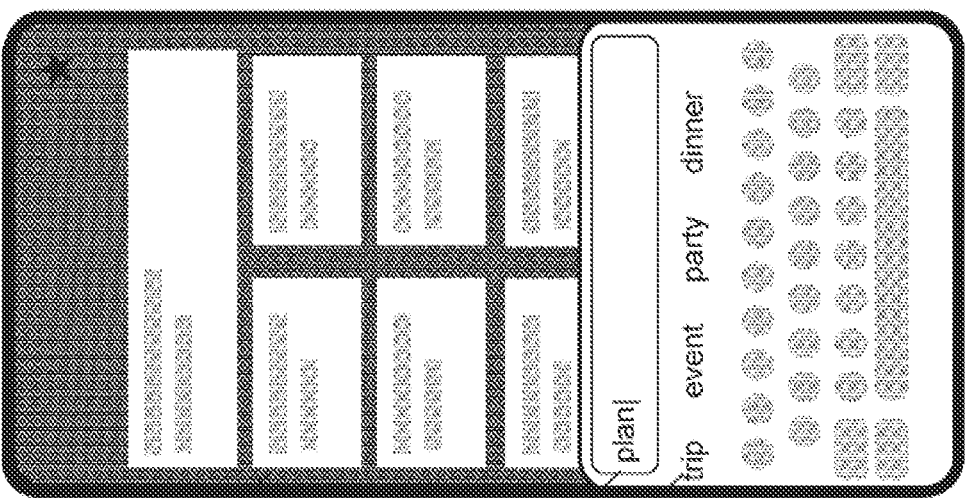
FIG. 13A depicts a user interface according to example embodiments of the present disclosure.
Figure 13B:
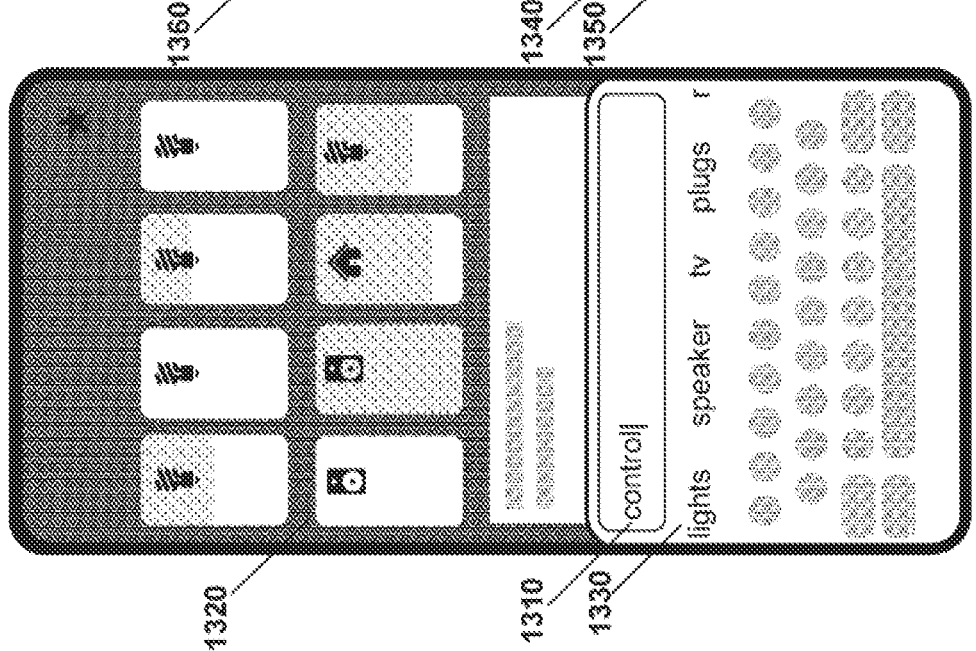
FIG. 13B depicts a user interface according to example embodiments of the present disclosure.
Figure 13C:
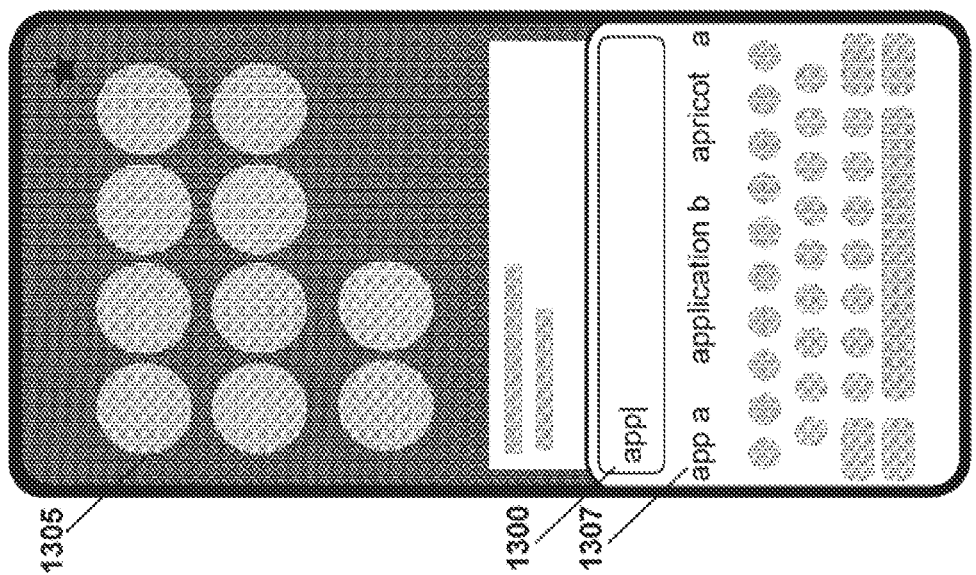
FIG. 13C depicts a user interface according to example embodiments of the present disclosure.

FIGS. 13A-B depict various user inputs and predictive intent results. FIG. 13A depicts an example user input indicative of a search for an application. In response the system can provide for display search results 1305 including applications and/or spaces with similar functionality to the application entered in the search bar 1300. The system can also provide suggested search terms 1307 in response to determining a predictive intent of a user input. FIG. 13B depicts an example user input indicative of a search for control 1310. For example, a user can have devices with internet of things technology that can be communicatively connected (e.g., via Wifi, Bluetooth, etc.). The system can provide predictive intent of what devices a user wants to control (e.g., lights, setting an alarm, updating a thermostat, adjusting volume on a speaker). The system can provide predictive intent via search results 1320 and/or suggested search terms 1330. FIG. 13C depicts an example user input indicative of a user input search for plan into search bar 1340. In response to obtaining a user request indicative of plan, the system can suggest one or more search terms 1350 based on predictive intents. Additionally, or alternatively, the system can surface one or more potential results 1360 related to the suggested search terms.

Figure 14A:
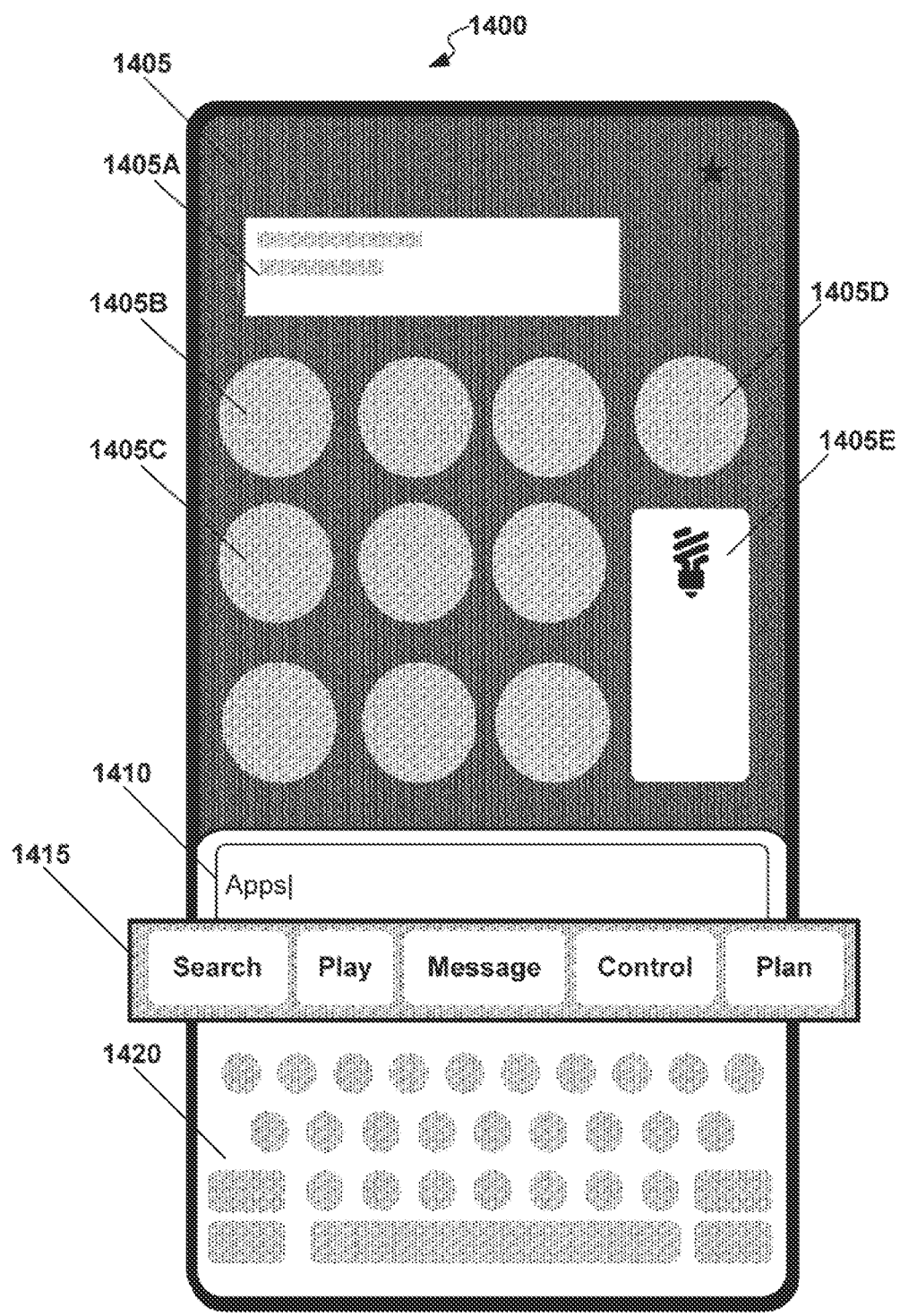
FIG. 14A depicts a user interface according to example embodiments of the present disclosure.

FIG. 14A depicts an example user interface 1400 comprising a composed space 1405, a composed intent 1410, predictive intents 1415, and a keyboard 1420. For example, composed space 1405 can include a plurality of components with varying functionalities and/or capability of a plurality of processing tasks. For example, A user can input a composed intent 1410 indicative of "Apps". In response, the system can generate predictive intents 1415 which can include search, play, message, control, plan, etc. Additionally, the system can generate composed space 1405 which can include a preview to a message application 1405, a plurality of gaming apps (e.g., 1405B and 1405C), a calendar app 1405D, and a component 1405E which can provide the user with control of a light in the user's home. Thus, FIG. 14 depicts an example system composed space based on a composed intent 1410 and predictive intents 1415.

Figure 14B:
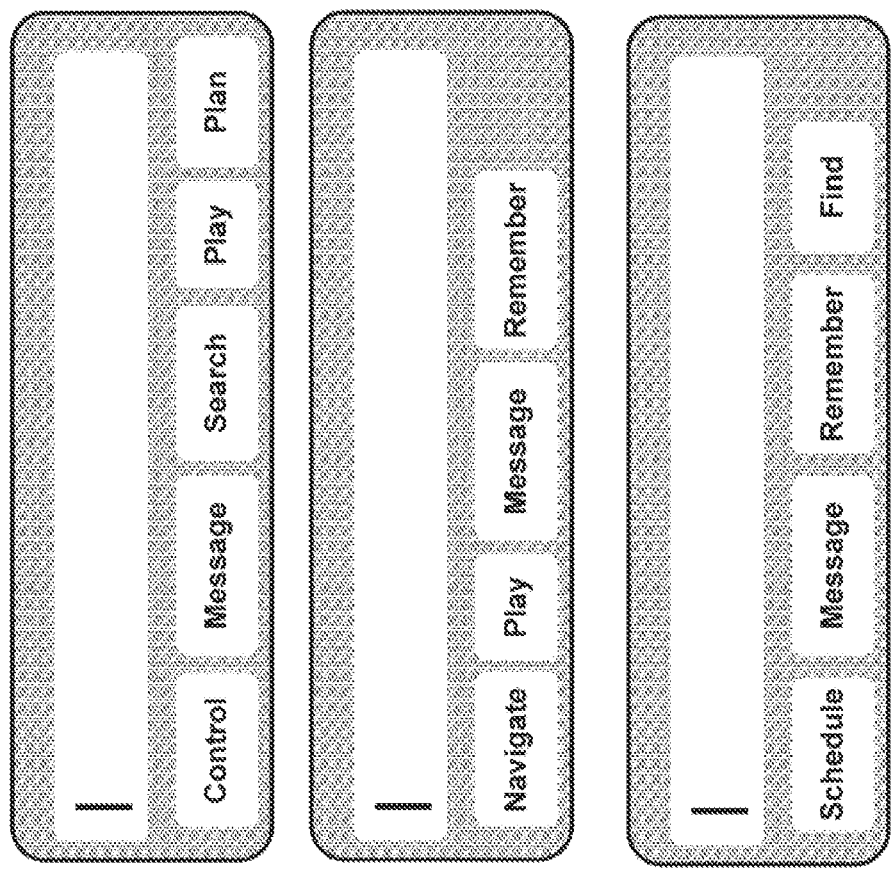
FIG. 14B depicts a sub element of a user interface according to example embodiments of the present disclosure.

FIG. 14B depicts an example of how user data indicative of user context (e.g., context 1430, 1435, 1440) can affect the ranking and display of predictive intents (e.g., predictive intents 1415). By way of example, user context 1430) can be associated with a user being at home. For example, the system can obtain data indicative of a user's current location being within a location associated with the user's profile as a home address. In response, the system can determine that the predictive intents related to controlling devices, sending a message, performing a search, playing a song, and/or planning are most relevant to a user based on the user's context.

By way of example, user context 1435 can be associated with a user being on the go. For example, the system can obtain data indicative of a user departing a location and/or data indicative of a user device moving a speed above a threshold speed for a time above a threshold time. In response to determining that the user is on the go, the system can determine that the predictive intents associated with navigation, playing music, sending messages, and/or setting reminders to remember are most relevant to a user.

By way of example, user context 1440 can be associated with a user being at work. For example, a system can determine that a user's current location is the same location as a work address associated with the user's profile. In response to determine that the user is at work, the system can rank predictive intents based on behavioral and cultural signs. For example, the system can rank predictive intents including scheduling, messaging, remembering, and/or finding higher than a predictive intent related to navigation.

Figure 15A:
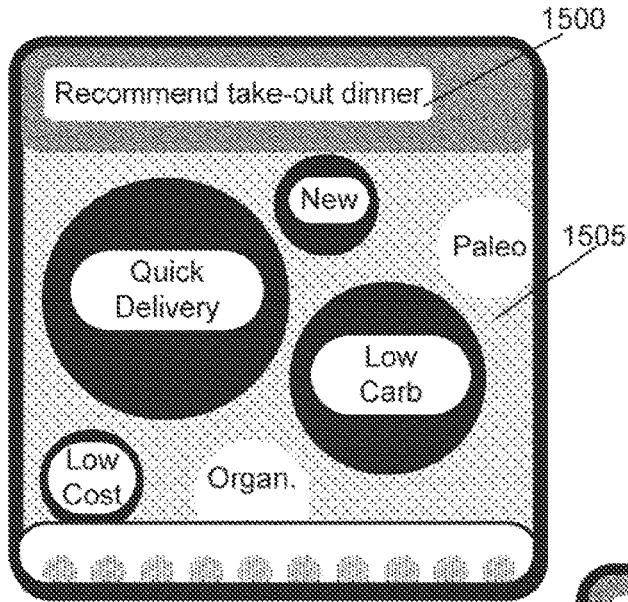
FIG. 15A depicts a sub element of a user interface according to example embodiments of the present disclosure.

FIGS. 15A-E depict various adaptations of the composer component of the system (e.g., composer component 220). For example, the composer component can adapt the composed space to display inputs that are more related to the user input and user intent. For Example, FIG. 15A depicts a user input 1500 indicative of "recommend take-out dinner". In response to obtaining user input indicative of a user requesting dinner recommendations, the system can provide for display components 1505 relating to features of potential dinner options. For example, features can include timing of delivery, whether the food has been ordered before dietary restrictions, costs, etc.

Figure 15B:
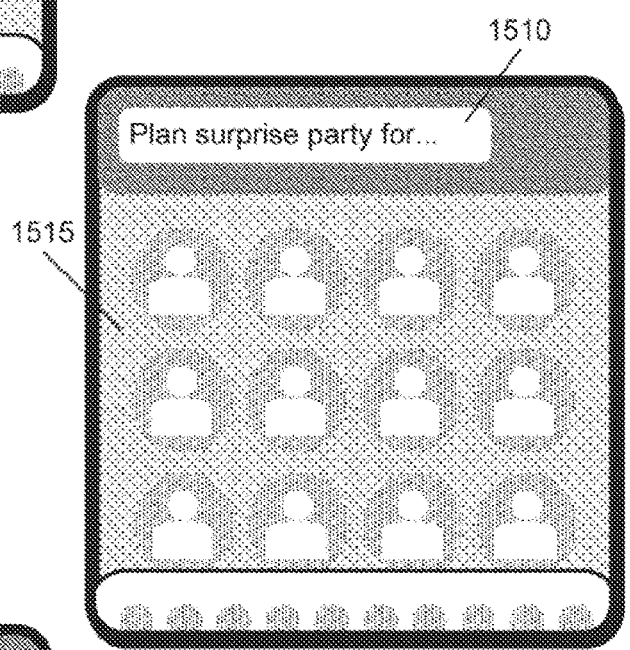
FIG. 15B depicts a sub element of a user interface according to example embodiments of the present disclosure.

In an additional example, FIG. 15B depicts a user input 1510 indicative of "plan a surprise party for . . . ". In response to obtaining user input indicative of a user intent to plan a surprise party, the system can provide for display recommended users 1515. The system can access an index comprising user data associated with each recommended user 1515. For example, user data can include a contact created by the user who input the search "plan a surprise party for". The user data can include contact information, birthday information, address information, and/or any other information stored within the user's contacts. Additionally, or alternatively, the system can obtain a list of candidate users from a search of users with connected social media accounts to the user who submitted the request. The system can parse an index of recommended users and respective user data to determine which recommended users the requesting user is most likely to throw a surprise party for. For example, the system can rank the recommended users based on which user has the nearest upcoming birthday, etc. In response, the system can display the candidate users 15B.

Figure 15C:
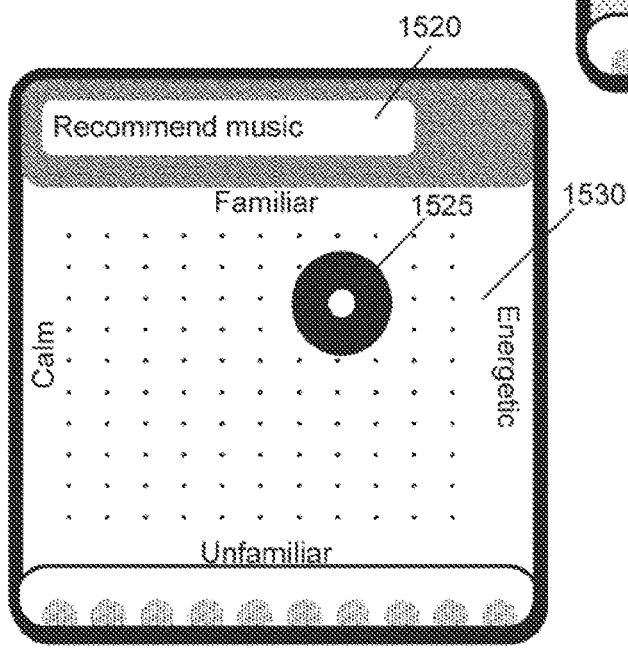
FIG. 15C depicts a sub element of a user interface according to example embodiments of the present disclosure.

In an additional example, FIG. 15C depicts a composed space that provides an interface element 1520 for obtaining user input 1525. For example, the system can obtain user input indicative of a user searching for "recommended music". In response, the system can provide for display a space 1530 comprising a graph with features of potential music suggestions. For instance, the graph can include a y-axis comprising the level of familiarity of the user with the music and an x-axis comprising the calmness or energy of the music. A user can indicate selection of slightly familiar and energetic music via interaction with interface element 1520. In response, the system can determine music to provide to the user (e.g., via an application, composed space, etc.).

Figure 15D:
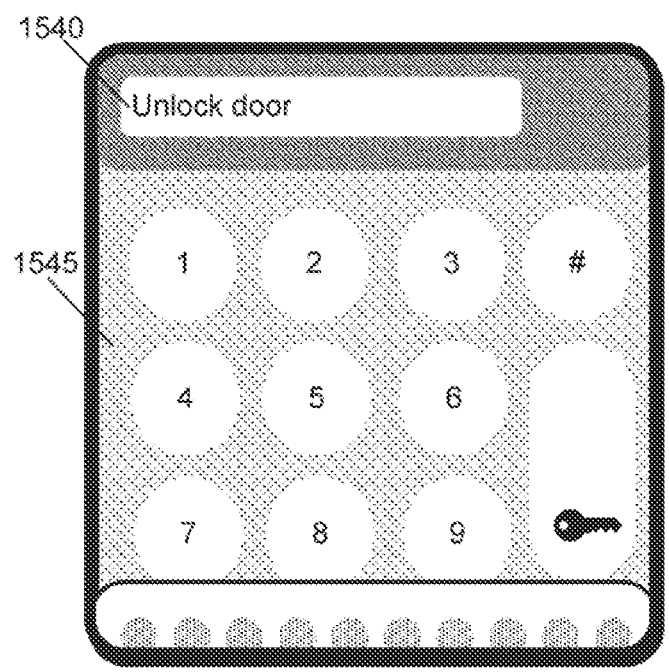
FIG. 15D depicts a sub element of a user interface according to example embodiments of the present disclosure.

In an additional example, FIG. 15D depicts the system presenting a keypad 1535 in response to obtaining user input 1540 indicative of "unlock door." The keypad 1535 can be configured to obtain user input (e.g., of a code to unlock a door). In response to obtaining input indicative of a correct code, the system can cause a door communicatively connected to the space and/or application to unlock.

Figure 15E:
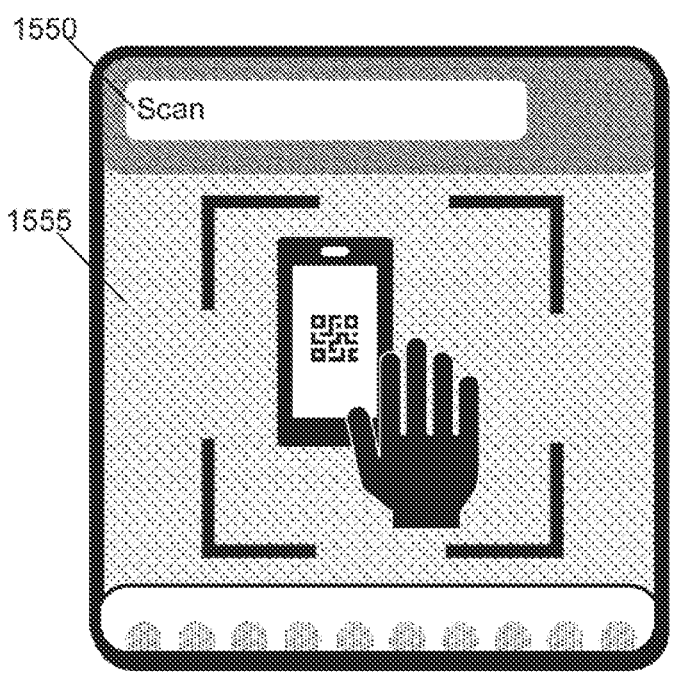
FIG. 15E depicts a sub element of a user interface according to example embodiments of the present disclosure.

In an additional example, FIG. 15E depicts the system launching an application and or space that integrates a processing task associated with scanning a QR code. For example, the system can obtain user input 1545 indicative of an intent to "scan". In response, the system can launch a functionality 1550 associated with a camera or some other form of image detection and/or scanning device.

Figures 16, 17:
FIG. 16 depicts user interfaces according to example embodiments of the present disclosure.
FIG. 17 depicts user interfaces according to example embodiments of the present disclosure.

FIGS. 16-18 depict example composed modular application spaces with cross-functionalities. For instance, FIG. 16, depicts a "Good Heart" space 1600. The good heart space 1600 can include a heart rate component 1602, a meditation component 1604, and a learn component 1606. The good heart space 1600 can include further components which are not displayed in FIG. 16, but which can be accessed by a user scrolling on a user interface. Each respective component 1602, 1604, and 1606 can be components generated by developers to be used as part of a combined space. Additionally, or alternatively, each respective component 1602, 1604, and 1606 can be components from a decomposed application which can be extracted by developers and/or the system to be combined to generate spaces. For example, the heart rate component 1602 can be a component generated by a developer to pair with a fitness tracker. Additionally, or alternatively, the heart rate component 1602 can be a portion of a fitness tracker application which has been extracted and provided for display within good heart space 1600. The system can automatically compose good heart space 1602 in response to a user input of "manage my heart condition". For example, the system can determine that components (e.g., components) with tags related to health, heart, blood pressure, meditation, etc. are related to heart condition management. In response, the system can parse a component index to identify one or more components and/or spaces which are related to the query "manage my heart condition". Thus, the system can compose good heart space 1600 and/or retrieve a previously composed space to present to the user. In some embodiments, good heart space 1600 can be updated daily to provide updated components. For example, the learn component 1606 can be updated each day to provide a variety of articles, videos, meal plans, etc. to educate the user on factors related to good heart health.

FIG. 17, for example depicts a daily routine space 1700. Daily routine space 1700 can include a first component 1702, a second component 1704, a third component 1706, and a fourth component 1708. For example, the first component 1702 can be associated with scheduled events. The first component 1702 can provide details of the event including the day and tie. The first component 1702 can be associated with a processing task of scheduling and/or a calendar application functionality. Second component 1704 can be associated with an estimated time of arrival for said meeting via candidate modes of transportation. For example, the system can determine the current location of a user and the location associated with the scheduled meeting. The system can determine potential routes and means of transportation (e.g., walking, driving by car, public transit, rideshare). The system can provide various options, and in response to a user selection of any of the options, the system can update daily routine space 1700 to launch a component associated with the selected option within the window for a seamless user experience. Third component 1706 can include information related to weather in the user's current location. Fourth component 1708 can include a user interface element which can obtain user input indicative of a selection of a mood of the user. Fourth component 1708 can include options for music, podcasts, videos, or other media for a user to select and play within the daily routine space 1700. As described herein with regard to prior figures (e.g., FIG. 16), the system can automatically update components of space 1700 based on contextual data, user input, etc. Thus, the system can retrieve relevant spaces for the user and generate system composed modular application interfaces to reduce processing needs associated with a user continually downloading new applications and/or switching between multiple applications on a multiple device.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure covers such alterations, variations, and/or equivalents.

What is claimed is:

1. A system for providing an adaptive user interface, comprising:
   one or more processors; and
   one or more computer-readable media storing instructions that are executable to cause the one or more processors to perform operations, the operations comprising:
   obtaining component data associated with a plurality of components;
   generating an index of the component data;
   obtaining, via an initial user interface comprising an input component, user input data indicative of a request;
   processing the user input data to determine an intent associated with the request;
   obtaining, based on the intent, data indicative of one or more components from the index, wherein a first component of the one or more components comprises a portion of functionality associated with code that when executed causes the system to perform a processing task;
   determining a rank for the first component based on the intent associated with the request and the portion of functionality of the first component, wherein the first component is ranked higher than a second component based on a similarity of the first component and the intent; and
   modifying the initial user interface to generate an updated user interface by removing the input component and displaying the first component and one or more additional components, wherein the components are displayed based at least in part on the rank of the respective component.

2. The system of claim 1, wherein the portion of functionality comprises at least one of a functionality generated by a user or a functionality generated by a developer.

3. The system of claim 2, wherein the portion of functionality comprises at least one of:
   (i) coordinating scheduling for a user,
   (ii) causing media to play,
   (iii) coordinating a user placing an order,
   (iv) coordinating a leg of travel for a user,
   (v) providing location specific information,
   (vi) providing a link or preview of third-party content,
   (vii) providing an input component, or
   (viii) providing means for controlling items associated with the user.

4. The system of claim 1, wherein the first component comprises an application.

5. The system of claim 1, the operations comprising:
   providing for display a space comprising a plurality of components.

6. The system of claim 5, wherein the space is automatically generated based at least in part on data associated with an individual user or aggregated data indicative of a plurality of users.

7. The system of claim 1, wherein determining the rank for the first component is based on at least one of:
   (i) one or more user generated spaces,
   (ii) semantic processing of relationships between a plurality of components in a user generated space,
   (iii) the index of the component data, or
   (iv) prediction of a relationship between a plurality of candidate components.

8. The system of claim 6, wherein determining the rank is performed by a machine-learned model.

9. The system of claim 8, the operations comprising:
   generating an index of the one or more user generated spaces; and
   training the machine-learned model using the index of the one or more user generated spaces.

10. The system of claim 7, wherein the semantic processing of relationship between a plurality of components in the user generated space comprises:
    obtaining data indicative of a plurality of components associated with the user generated space; and
    updating, based on the data indicative of the plurality of components, the index of the component data.

11. The system of claim 10, wherein the data indicative of the plurality of components associated with the user generated space comprises at least one of:
    (i) data indicative of cross-functionality of the one or more components associated with the user generated space,
    (ii) data indicative of one or more tags associated with the respective components associated with the user generated space, or
    (iii) data indicative of a description of the user generated space.

12. The system of claim 11, wherein the one or more tags comprise a label of at least one of a component type, subject matter, or associated intent.

13. The system of claim 11, wherein the data indicative of the description of the user generated space comprises a user-generated description of the intent associated with the user generated space.

14. The system of claim 11, wherein the data indicative of the description of the user generated space comprises an intent generated by a machine-learned model indicative of an intent associated with the user generated space.

15. The system of claim 1, wherein processing the user input data to determine an intent associated with the request, comprises:
maintaining data enclaves comprising user data, wherein the data enclaves prevent access to user data from third parties;
obtaining requests from component components for access to the user data; and
providing limited access to user data.

16. The system of claim 15, wherein providing limited access to user data comprises:
obtaining portions of functionality associated with the component components;
determining necessary user data for performing the portions of functionality;
providing access to the necessary user data to perform the portions of functionality;
processing, within the data enclaves, the user data and the portions of functionality; and
performing the portions of functionality using the accessed user data.

17. The system of claim 15, wherein the user data comprises data indicative of at least one of
(i) one or more user preferences,
(ii) user account data, or
(iii) user history.

18. A computer-implemented method comprising:
obtaining component data associated with a plurality of components;
generating an index of the component data;
obtaining, via an initial user interface comprising an input component, user input data indicative of a request;
processing the user input data to determine an intent associated with the request;
obtaining, based on the intent, data indicative of one or more components from the index, wherein a first component of the one or more components comprises a portion of functionality associated with code that when executed causes a system to perform a processing task;
determining a rank for the first component based on the intent associated with the request and the portion of functionality of the first component, wherein the first component is ranked higher than a second component based on a similarity of the first component and the intent; and
modifying the initial user interface to generate an updated user interface by removing the input component and displaying the first component and one or more additional components are displayed based at least in part on the rank of the respective component.

19. The method of claim 18, wherein the respective component comprises a portion of functionality, wherein the portion of functionality comprises at least one of a functionality generated by a user or a functionality generated by a developer.

20. A non-transitory computer readable medium embodied in a computer-readable storage device and comprising instructions that, when executed by a processor, cause the processor to perform operations, the operations comprising:
obtaining component data associated with a plurality of components;
generating an index of the component data;
obtaining, via an initial user interface comprising an input component, user input data indicative of a request;
processing the user input data to determine an intent associated with the request;
obtaining, based on the intent, data indicative of one or more components from the index, wherein a first component of the one or more components comprises a portion of functionality associated with code that when executed causes a system to perform a processing task;
determining a rank for the first component based on the intent associated with the request and the portion of functionality of the first component, wherein the first component is ranked higher than a second component based on a similarity of the first component and the intent; and
modifying the initial user interface to generate an updated user interface by removing the input component and displaying the first component and one or more additional components are displayed based at least in part on the rank of the respective component.

* * * * *